(12) United States Patent
Tominaga et al.

(10) Patent No.: US 12,743,888 B2
(45) Date of Patent: Sep. 22, 2026

(54) ROAD SURVEILLANCE SYSTEM, ROAD SURVEILLANCE METHOD, AND NON-TRANSITORY STORAGE MEDIUM

(71) Applicant: NEC Corporation, Tokyo (JP)

(72) Inventors: Shin Tominaga, Tokyo (JP); Yusuke Imai, Tokyo (JP); Kazutoshi Sagi, Tokyo (JP); Yuzo Senda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 420 days.

(21) Appl. No.: 18/237,129

(22) Filed: Aug. 23, 2023

(65) Prior Publication Data

US 2024/0104931 A1 Mar. 28, 2024

(30) Foreign Application Priority Data

Sep. 27, 2022 (JP) ................................ 2022-154133

(51) Int. Cl.
*G06V 20/54* (2022.01)
*G06V 20/40* (2022.01)

(52) U.S. Cl.
CPC .............. *G06V 20/54* (2022.01); *G06V 20/46* (2022.01); *G06V 2201/07* (2022.01); *G06V 2201/08* (2022.01)

(58) Field of Classification Search
None
See application file for complete search history.

(56) References Cited

U.S. PATENT DOCUMENTS 5,999,877 A * 12/1999 Takahashi .............. G06V 20/54 340/916
7,082,209 B2 * 7/2006 Ito ........................... G06T 7/254 348/169
(Continued)

FOREIGN PATENT DOCUMENTS

JP 2003-259358 A 9/2003
JP 2006-090826 A 4/2006
(Continued)

OTHER PUBLICATIONS

JP-2009265827-A (machine translation) (Year: 2009).*
JP Office Action for JP Application No. 2022-154133, mailed on Apr. 21, 2026 with English Translation.

*Primary Examiner* — Chan S Park
(74) *Attorney, Agent, or Firm* — Sughrue Mion, PLLC

(57) ABSTRACT

A road surveillance system includes a video acquisition unit, a target determination unit, and a display control unit. The video acquisition unit acquires a video that captures a road. The target determination unit determines, based on a result of comparison between at least one frame image constituting the video and a reference image, and a first criterion, whether the at least one frame image is an analysis target. The display control unit causes a display unit to display information based on a result of the determination. The display control unit includes a first control unit and a second control unit. The first control unit causes the display unit to display an analysis result of at least one frame image being determined to be an analysis target. The second control unit causes the display unit to display detection information indicating that a frame image not being an analysis target is detected.

19 Claims, 25 Drawing Sheets

(56) References Cited

U.S. PATENT DOCUMENTS

| | | | | |
|---|---|---|---|---|
| 8,964,030 | B2 * | 2/2015 | Itoh | G06V 20/52 348/143 |
| 10,643,570 | B2 * | 5/2020 | Tanaka | G09G 5/003 |
| 10,755,128 | B2 * | 8/2020 | Turkelson | G06T 1/0014 |
| 12,100,154 | B2 * | 9/2024 | Iwase | G06T 7/97 |
| 12,211,194 | B2 * | 1/2025 | Ebizuka | G06T 7/001 |
| 2002/0041698 | A1 * | 4/2002 | Ito | G06T 7/254 382/103 |
| 2004/0017930 | A1 * | 1/2004 | Kim | G06V 40/161 382/118 |
| 2004/0233283 | A1 * | 11/2004 | Kang | G08B 13/196 348/E7.086 |
| 2011/0243383 | A1 * | 10/2011 | Oyaizu | G06T 7/248 382/103 |
| 2012/0026326 | A1 * | 2/2012 | Itoh | G06V 10/30 348/143 |
| 2013/0329052 | A1 * | 12/2013 | Chew | G06T 7/0008 348/159 |
| 2017/0132866 | A1 * | 5/2017 | Kuklinski | G07D 7/2083 |
| 2018/0124319 | A1 * | 5/2018 | Jo | H04N 5/145 |
| 2019/0228735 | A1 * | 7/2019 | Tanaka | G09G 5/003 |
| 2020/0193206 | A1 * | 6/2020 | Turkelson | H04N 25/00 |
| 2021/0158525 | A1 * | 5/2021 | Iwase | A61B 3/0025 |
| 2021/0201069 | A1 * | 7/2021 | Chae | G06V 20/62 |
| 2021/0209393 | A1 * | 7/2021 | Chae | G06V 30/1463 |
| 2023/0377128 | A1 * | 11/2023 | Kubota | B23Q 17/249 |

FOREIGN PATENT DOCUMENTS

| | | | |
|---|---|---|---|
| JP | 2009265827 | A | * 11/2009 |
| JP | 2010-044502 | A | 2/2010 |
| JP | 2012-034147 | A | 2/2012 |
| JP | 2018-087484 | A | 6/2018 |
| JP | 2019-029940 | A | 2/2019 |
| JP | 2019-101934 | A | 6/2019 |

* cited by examiner

FIG. 5

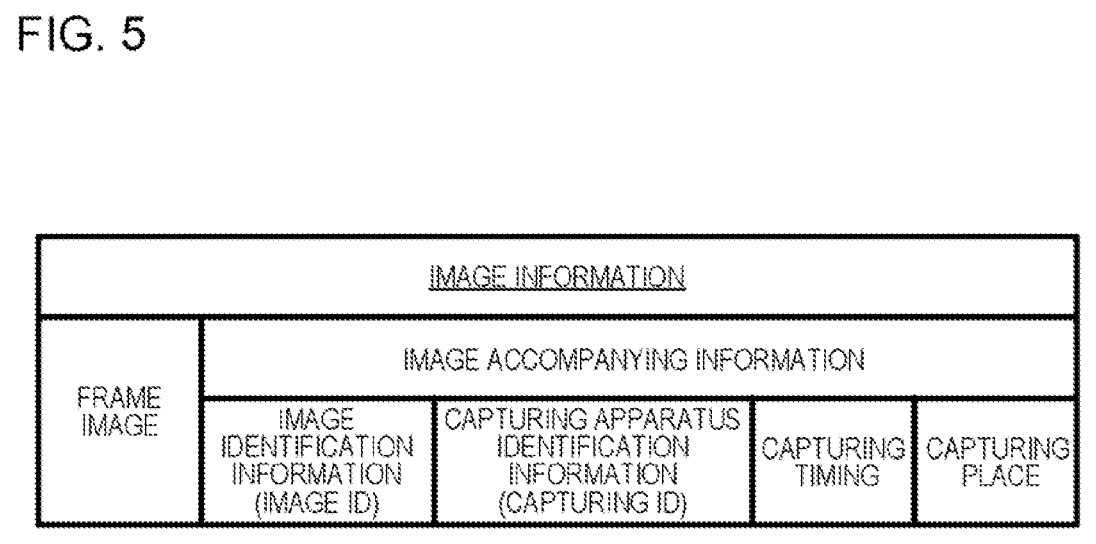

| IMAGE INFORMATION | | | | |
|---|---|---|---|---|
| FRAME IMAGE | IMAGE ACCOMPANYING INFORMATION | | | |
| | IMAGE IDENTIFICATION INFORMATION (IMAGE ID) | CAPTURING APPARATUS IDENTIFICATION INFORMATION (CAPTURING ID) | CAPTURING TIMING | CAPTURING PLACE |

FIG. 7

| ANALYSIS INFORMATION | | | | |
|---|---|---|---|---|
| ROAD STATE | | EVENT | FRAME IMAGE | IMAGE ACCOMPANYING INFORMATION |
| OBJECT ID | OBJECT STATE | | | |

FIG. 9

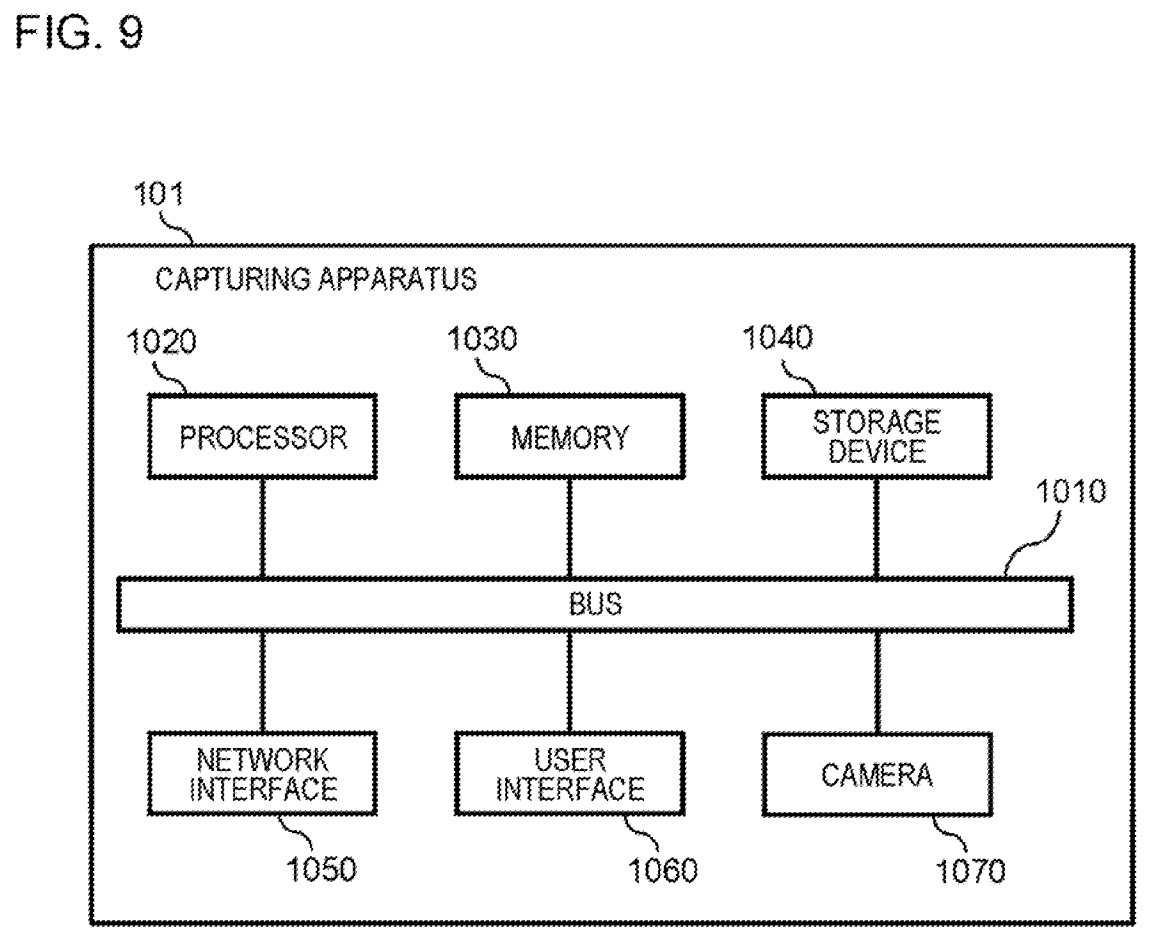

101
CAPTURING APPARATUS
1020 PROCESSOR
1030 MEMORY
1040 STORAGE DEVICE
1010 BUS
1050 NETWORK INTERFACE
1060 USER INTERFACE
1070 CAMERA

FIG. 10

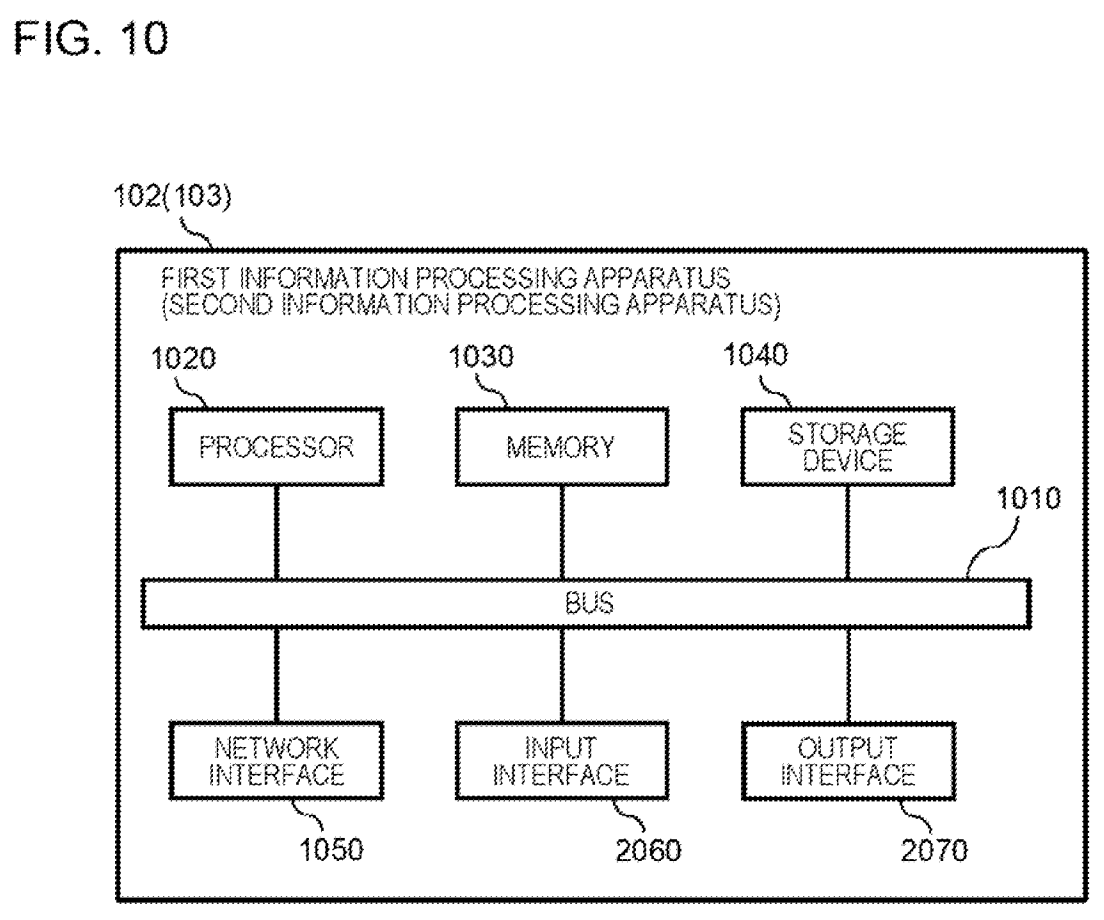

102(103)
FIRST INFORMATION PROCESSING APPARATUS
(SECOND INFORMATION PROCESSING APPARATUS)
1020
PROCESSOR
1030
MEMORY
1040
STORAGE DEVICE
1010
BUS
1050
NETWORK INTERFACE
2060
INPUT INTERFACE
2070
OUTPUT INTERFACE

FIG. 12
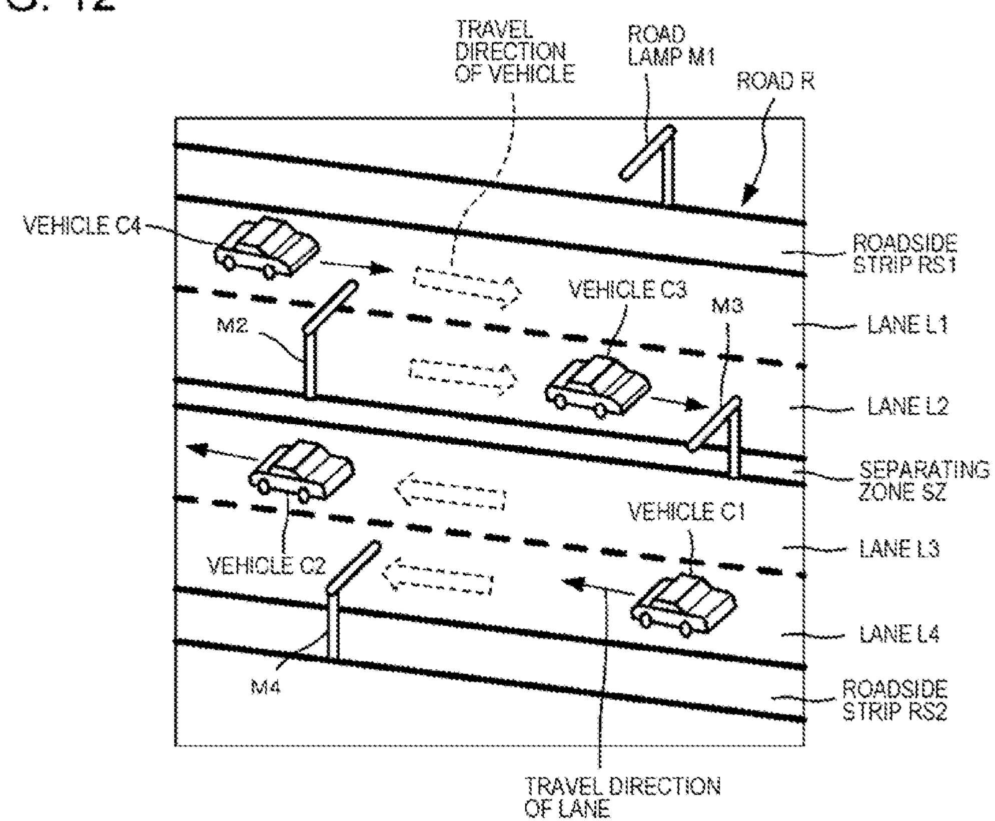
TRAVEL DIRECTION OF VEHICLE
ROAD LAMP M1
ROAD R
VEHICLE C4
ROADSIDE STRIP RS1
VEHICLE C3
M3
M2
LANE L1
LANE L2
SEPARATING ZONE SZ
VEHICLE C1
LANE L3
VEHICLE C2
LANE L4
M4
ROADSIDE STRIP RS2
TRAVEL DIRECTION OF LANE

| IMAGE IDENTIFICATION INFORMATION (IMAGE ID) | P1 |
|---|---|
| CAPTURING APPARATUS IDENTIFICATION INFORMATION (CAPTURING ID) | CM1 |
| CAPTURING TIMING | T1 |
| CAPTURING PLACE | L1 |

FIG. 16

(a)
FRAME IMAGE IM2
COMPARISON AREA A2
ROAD LAMP M1

COMPAR-ISON (b)
REFERENCE IMAGE
ROAD LAMP M1
COMPARISON AREA AR

ROAD SURVEILLANCE SYSTEM, ROAD SURVEILLANCE METHOD, AND NON-TRANSITORY STORAGE MEDIUM

RELATED ART

The present invention relates to a road surveillance system, an information processing apparatus, a road surveillance method, and a non-transitory storage medium.

In a system for surveillance of a road, a system that detects an abnormality of a camera capturing a road has been proposed.

For example, a technique disclosed in PTL 1 (Japanese Patent Application Publication No. 2012-034147) detects a camera abnormality, based on a difference in luminance value between an input image acquired from the camera and a criterion image acquired in advance, and notifies of a kind of the abnormality.

A camera abnormality disclosed in PTL 1 includes partial blocking, complete blocking, field angle deviation (deviation in camera direction), blurring, noise, halation, and the like.

However, support of more efficient road surveillance has been expected. For example, the technique disclosed in PTL 1 does not disclose how an input image from a camera is used when there is no camera abnormality.

One example of an object of the present invention is, in view of the problem described above, to provide a road surveillance system, a road surveillance method, a non-transitory storage medium and the like that solve the problem of supporting efficient road surveillance.

One aspect of the present invention provides a road surveillance system including:

a video acquisition means for acquiring a video that captures a road;

a target determination means for determining, based on a result of comparison between at least one frame image constituting the video and a reference image, and a first criterion, whether the at least one frame image is an analysis target; and a display control means for causing a display means to display information based on a result of the determination, wherein the display control means includes a first control means for causing the display means to display an analysis result of the at least one frame image being determined to be the analysis target, and a second control means for causing the display means to display detection information indicating that a frame image not being an analysis target is detected.

One aspect of the present invention provides an information processing apparatus including:

a video acquisition means for acquiring a video that captures a road;

a target determination means for determining, based on a result of comparison between at least one frame image constituting the video and a reference image, and a first criterion, whether the at least one frame image is an analysis target; and a transmission means for transmitting information based on a result of the determination, wherein the transmission means includes a first transmission means for transmitting an analysis result of the at least one frame image being determined to be the analysis target, and a second transmission means for transmitting detection information indicating that a frame image not being an analysis target is detected.

One aspect of the present invention provides a road surveillance method including, by one or more computers:

acquiring a video that captures a road;

determining, based on a result of comparison between at least one frame image constituting the video and a reference image, and a first criterion, whether the at least one frame image is an analysis target; and causing a display means to display information based on a result of the determination, wherein the causing the display means to display information includes causing the display means to display an analysis result of the at least one frame image being determined to be the analysis target, and causing the display means to display detection information indicating that a frame image not being an analysis target is detected.

One aspect of the present invention provides a program causing one or more computers to execute:

acquiring a video that captures a road;

determining, based on a result of comparison between at least one frame image constituting the video and a reference image, and a first criterion, whether the at least one frame image is an analysis target; and causing a display means to display information based on a result of the determination, wherein the causing the display means to display information includes causing the display means to display an analysis result of the at least one frame image being determined to be the analysis target, and causing the display means to display detection information indicating that a frame image not being an analysis target is detected.

One aspect of the present invention enables supporting efficient road surveillance.

BRIEF DESCRIPTION OF THE DRAWINGS

FIG. 5 is a diagram illustrating a configuration example of image information according to the first example embodiment.

FIG. 7 is a diagram illustrating a configuration example of analysis information according to the first example embodiment.

FIG. 9 is a diagram illustrating a physical configuration example of a capturing apparatus according to the first example embodiment.

FIG. 10 is a diagram illustrating a physical configuration example of the first information processing apparatus according to the first example embodiment.

FIG. 12 is a diagram illustrating one example of a road R to be captured.

FIG. 16 is diagrams illustrating another example of a frame image IM2 and the reference image to be compared with each other.

DETAILED DESCRIPTION

Hereinafter, example embodiments of the present invention will be described with reference to the drawings. Note that, in all of the drawings, a similar component has a similar reference sign, and description thereof will be appropriately omitted.

First Example Embodiment (Overview)

Figure 1:
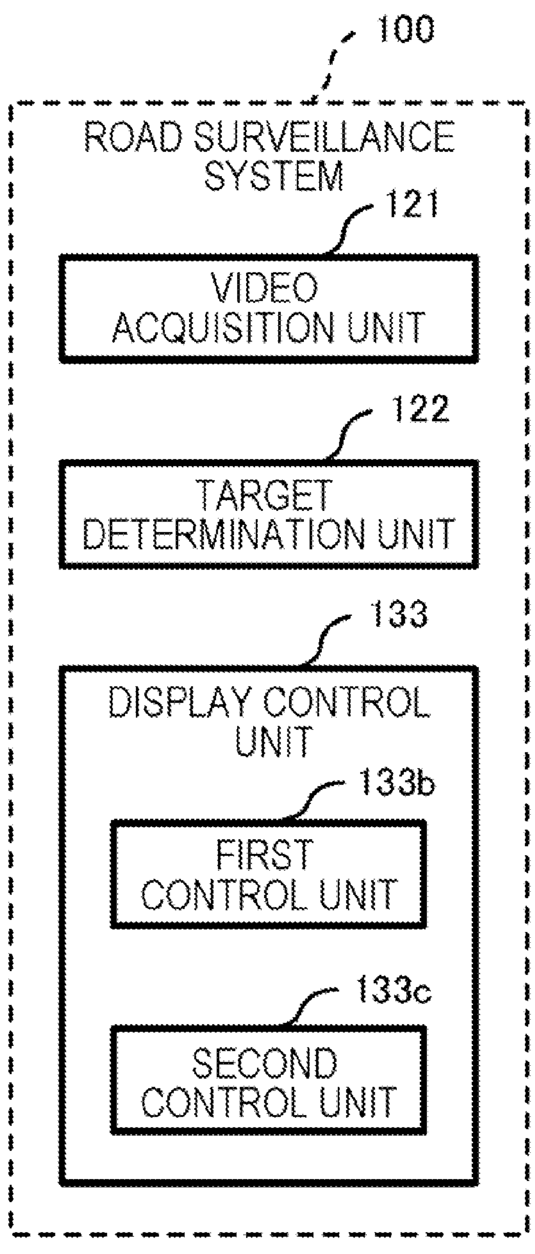
FIG. 1 is a diagram illustrating an overview of a road surveillance system according to a first example embodiment.

FIG. 1 is a diagram illustrating an overview of a road surveillance system 100 according to a first example embodiment. The road surveillance system 100 includes a video acquisition unit 121, a target determination unit 122, and a display control unit 133.

The video acquisition unit 121 acquires a video that captures a road.

The target determination unit 122 determines, based on a result of comparison between at least one frame image constituting the video and a reference image and a first criterion, whether the at least one frame image is an analysis target.

The display control unit 133 causes a display unit to display information based on a result of the determination.

The display control unit 133 includes a first control unit 133*b* and a second control unit 133*c*. The first control unit 133*b* causes the display unit to display an analysis result of at least one frame image being determined to be an analysis target. The second control unit 133*c* causes the display unit to display detection information indicating that a frame image not being an analysis target is detected.

The road surveillance system 100 enables supporting efficient road surveillance.

Figure 2:
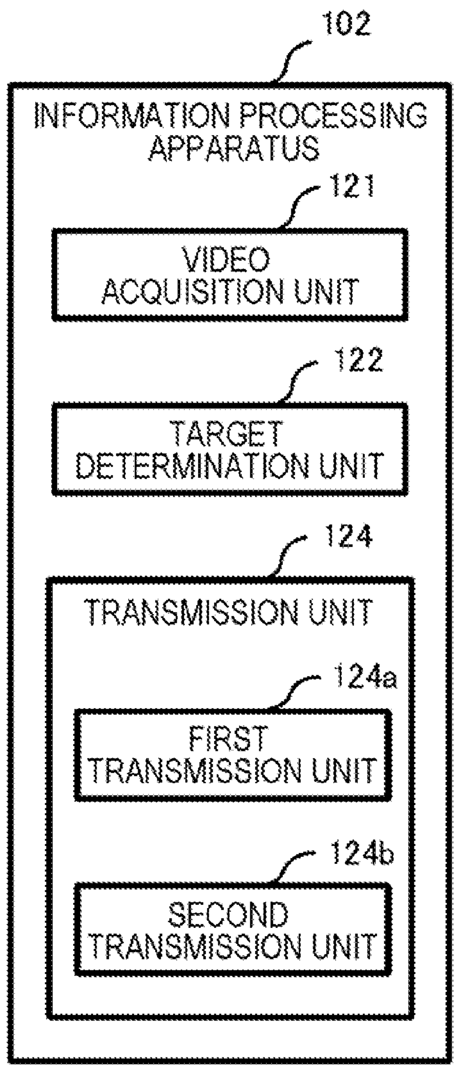
FIG. 2 is a diagram illustrating an overview of an information processing apparatus according to the first example embodiment.

FIG. 2 is a diagram illustrating an overview of an information processing apparatus 102 according to the first example embodiment. The information processing apparatus 102 includes a video acquisition unit 121, a target determination unit 122, and a transmission unit 124.

The video acquisition unit 121 acquires a video that captures a road.

The target determination unit 122 determines, based on a result of comparison between at least one frame image constituting the video and a reference image and a first criterion, whether the at least one frame image is an analysis target.

The transmission unit 124 transmits information based on a result of the determination.

The transmission unit 124 includes a first transmission unit 124*a* and a second transmission unit 124*b*. The first transmission unit 124*a* transmits an analysis result of at least one frame image being determined to be an analysis target. The second transmission unit 124*b* transmits detection information indicating that a frame image not being an analysis target is detected.

The information processing apparatus 102 enables supporting efficient road surveillance.

Figure 3:
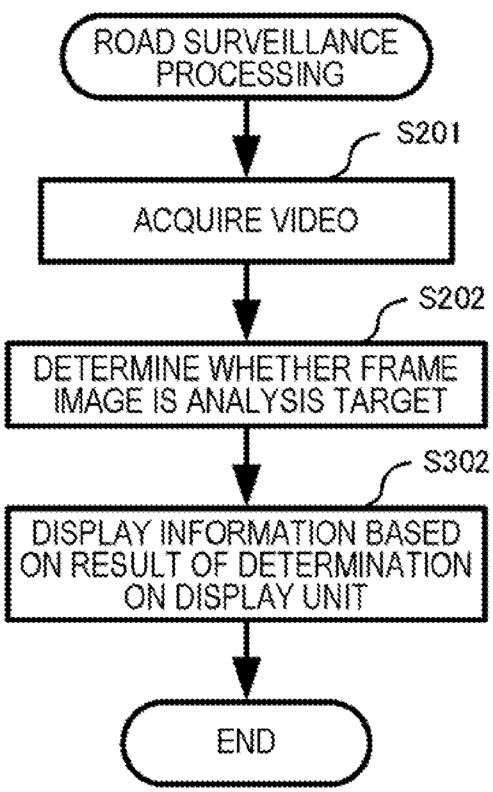
FIG. 3 is a flowchart illustrating an overview of a road surveillance method according to the first example embodiment.

FIG. 3 is a flowchart illustrating an overview of a road surveillance method according to the first example embodiment.

The video acquisition unit 121 acquires a video that captures a road (step S201).

The target determination unit 122 determines, based on a result of comparison between at least one frame image constituting the video and a reference image and a first criterion, whether the at least one frame image is an analysis target (step S202).

The display control unit 133 causes the display unit to display information based on a result of the determination (step S302).

The causing the display unit to display information includes causing the display unit to display an analysis result of the at least one frame image being determined to be an analysis target and causing the display unit to display detection information indicating that a frame image not being an analysis target is detected.

The road surveillance method enables supporting efficient road surveillance.

Hereinafter, a detailed example of the road surveillance system 100 according to the first example embodiment will be described.

(Detail)

Figure 4:
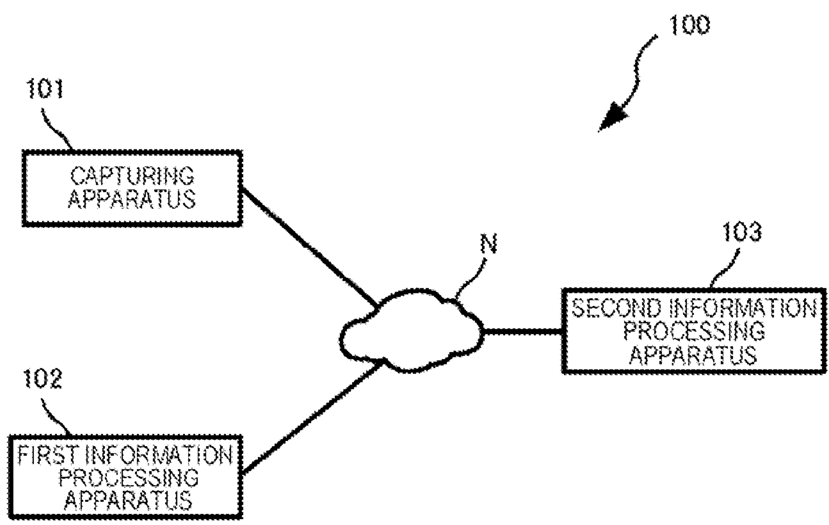
FIG. 4 is a diagram illustrating a configuration example of the road surveillance system according to the first example embodiment.

FIG. 4 is a diagram illustrating a configuration example of the road surveillance system 100 according to the first example embodiment. The road surveillance system 100 is a system for supporting surveillance of a road by a user. The road surveillance system 100 includes a capturing apparatus

101, a first information processing apparatus 102 (being equivalent to the "information processing apparatus 102" described above), and a second information processing apparatus 103.

The capturing apparatus 101, the first information processing apparatus 102, and the second information processing apparatus 103 are connected with one another via a network N being configured by, for example, wired connection, wireless connection, or a combination thereof, and are capable of transmitting and receiving information to and from one another via the network N.

Functional Configuration Example of Capturing Apparatus 101

The capturing apparatus 101 captures a road and generates a video. The video is constituted of a time series of frame images, that is, a plurality of images, that the capturing apparatus 101 captures.

Specifically, for example, the capturing apparatus 101 captures a predetermined place on a road at a predetermined frequency (frame rate), and generates a frame image every time the place is captured. In the present example embodiment, a capturing area, that is, an area captured in a frame image, of the capturing apparatus 101 is set for the capturing apparatus 101 in advance.

The capturing apparatus 101 generates image information including the generated frame image and transmits the generated image information to the first information processing apparatus 102. Specifically, for example, when the capturing apparatus 101 generates a frame image, the capturing apparatus 101 preferably generates image information and transmits the generated image information to the first information processing apparatus 102 in real time. Because of this configuration, the capturing apparatus 101 is capable of transmitting a video in real time.

Note that, a frame image may be either colored or monochrome, and the number of pixels of the frame image is preferably appropriately selected.

FIG. 5 is a diagram illustrating a configuration example of image information according to the first example embodiment. The image information is information in which image accompanying information is associated with a frame image that the capturing apparatus 101 generates. The image accompanying information includes, for example, image identification information, capturing apparatus identification information, capturing timing, and a capturing place.

The image identification information is information for identifying image information. Since image information is generated for each frame image, the image identification information is also information for identifying a frame image. The image identification information is hereinafter also referred to as an "image identification (ID)".

The capturing apparatus identification information is information for identifying the capturing apparatus 101. The capturing apparatus identification information is hereinafter also referred to as a "capturing ID".

The capturing timing is information indicating timing at which the frame image is captured. The capturing timing includes, for example, a date and a time. The time may be represented in predetermined units, such as 1/10 second and 1/100 second.

The capturing place is information indicating a place at which the frame image is captured. The capturing place is, for example, information indicating a place at which the capturing apparatus 101 is installed, and is constituted of a latitude and a longitude indicating the place. The capturing place may, in a case where the capturing apparatus 101 includes a position detection function, be acquired by using the position detection function, or may be set in advance by an installer. The position detection function is a function of detecting a position of the capturing apparatus 101, by using a global positioning system (GPS) or the like.

Note that, the image information is only required to include at least a frame image that captures a road, and does not have to include image accompanying information. The image accompanying information is not limited to the example described above, and is only required to include one or more of the image ID, the capturing ID, the capturing timing, the capturing place, and the like.

Functional Configuration Example of First Information Processing Apparatus 102

Figure 6:
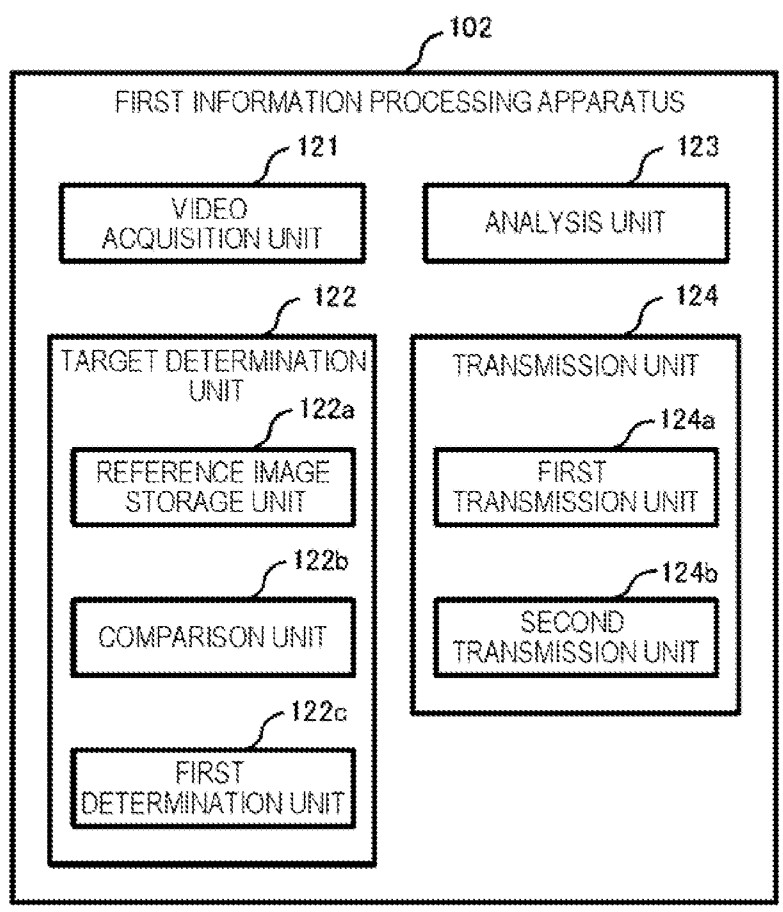
FIG. 6 is a diagram illustrating a functional configuration example of a first information processing apparatus according to the first example embodiment.

FIG. 6 is a diagram illustrating a functional configuration example of the first information processing apparatus 102 according to the first example embodiment. The first information processing apparatus 102 is an apparatus that analyzes a video that captures a road. The first information processing apparatus 102 includes a video acquisition unit 121, a target determination unit 122, an analysis unit 123, and a transmission unit 124.

The video acquisition unit 121 acquires a video that captures a road. For example, the video acquisition unit 121 acquires image information from the capturing apparatus 101 in real time. Because of this configuration, the video acquisition unit 121 acquires, in real time, a video that captures a road.

The target determination unit 122 determines, based on a result of comparison between at least one frame image constituting the video and a reference image and a first criterion, whether the at least one frame image is an analysis target.

The first criterion is a criterion that a frame image being to serve as an analysis target is required to satisfy. The analysis target is, for example, a target of analysis being performed by the analysis unit 123, which will be described in detail later.

For comparison between at least one frame image and the reference image, an image feature value of each image is preferably used. The image feature value is, for example, a feature value that indicates an area captured in a frame image (capturing area).

Specifically, for example, the target determination unit 122 includes, as illustrated in FIG. 6, a reference image storage unit **122*a*, a comparison unit 122*b*, and a first determination unit 122*c***.

The reference image storage unit **122*a* is a storage unit in which a reference image is stored in advance. The reference image is an image that captures a capturing area being set for the capturing apparatus 101 in advance. In other words, the reference image is an image that captures a proper capturing area of the capturing apparatus 101. Note that, in the reference image storage unit 122*a***, an image feature value of the reference image may be stored in advance in conjunction with or in place of the reference image.

The comparison unit **122*b* compares an image feature value of each of frame images with the image feature value of the reference image. The present example embodiment will be described by using an example in which a result of comparison is a degree of similarity between the image feature value of each of frame images and the image feature value of the reference image. That is, the comparison unit 122*b*** according to the present example embodiment derives a degree of similarity between the image feature value of each of frame images and the image feature value of the reference image.

The first determination unit 122_c_ determines, with respect to each of frame images, whether the frame image is an analysis target, based on a result of comparison performed by the comparison unit 122_b_ and the first criterion.

Specifically, for example, the first determination unit 122_c_ determines, with respect to each of the frame images, whether a result of the comparison performed by the comparison unit 122_b_ satisfies the first criterion. Then, when the result of comparison satisfies the first criterion, the first determination unit 122_c_ determines that the frame image is an analysis target. When the result of comparison does not satisfy the first criterion, the first determination unit 122_c_ determines that the frame image is not an analysis target.

When a degree of similarity is employed as a "result of comparison" as described above, the first criterion preferably defines, for example, a relationship between a degree of similarity and a threshold value. The present example embodiment will be described by using an example in which the first criterion is that a degree of similarity that the comparison unit 122_b_ derives is equal to or greater than a threshold value.

When at least one frame image is determined to be an analysis target, the analysis unit 123 analyzes the at least one frame image. Then, the analysis unit 123 generates analysis information including a result of the analysis (that is, an analysis result).

When a plurality of frame images are determined to be analysis targets, the analysis unit 123 according to the present example embodiment analyzes all the frame images that are determined to be analysis targets. Then, the analysis unit 123 according to the present example embodiment analyzes each of the frame images that are determined to be analysis targets, and generates analysis information including an analysis result with respect to each frame image.

Note that, the analysis unit 123 may, for example, analyze, among the frame images that are determined to be analysis targets, some frame images, such as frame images at a predetermined time interval. In addition, the analysis unit 123 does not have to analyze a frame image being determined not to be an analysis target.

Example of Analysis by Analysis Unit 123

Analysis performed by the analysis unit 123 may be appropriately selected. For example, the analysis unit 123 preferably performs analysis for road surveillance by processing a frame image being determined to be an analysis target. Then, the analysis unit 123 preferably generates analysis information including an analysis result.

Herein, description will be made by using as an example a case where the analysis is detection of a road state and an event.

The analysis unit 123 detects a road state by processing a frame image being determined to be an analysis target.

The road state is a state of an object on a road. The object on the road is, for example, one or a plurality of vehicles, fallen objects, and the like. The vehicle is, for example, one or a plurality of a passenger vehicle, a truck, a trailer, a construction vehicle, an emergency vehicle, a motorcycle, a bicycle, and the like. The fallen object is an object that has fallen on the road from a vehicle or the like, an object that has been blown onto the road due to wind or the like, or the like.

The road state may include existence or nonexistence of an object on the road. When an object exists on the road, the road state may include object identification information and an object state of each object. Note that, the existence or nonexistence of an object on the road may be represented by a flag indicating the existence or nonexistence, the number of objects on the road, or the like, or may be represented by whether object identification information is included in the road state.

The object identification information is information for identifying an object on the road. The object identification information is hereinafter also referred to as an "object ID". The object state is a state of each object.

Some or all of items included in the object state may differ for each kind of object. For example, an object state with respect to a vehicle (a vehicle state) is one or a plurality of a position of the vehicle, a travel direction of the vehicle, velocity of the vehicle, a movement line of the vehicle (a track on which the vehicle moved), an attribute of the vehicle, and the like. The attribute of a vehicle is, for example, one or a plurality of a kind of the vehicle, a size of the vehicle, color of the vehicle, a vehicle number displayed on a license plate, and the like. The kind of a vehicle is, for example, one or a plurality of a passenger vehicle, a truck, a trailer, a construction vehicle, an emergency vehicle, a motorcycle, a bicycle, and the like, which were described above.

For example, an object state with respect to a fallen object (a fallen object state) is one or a plurality of a position of the fallen object, a movement direction of the fallen object, movement velocity of the fallen object, and a movement line of the fallen object, an attribute of the fallen object, and the like. The attribute of a fallen object is one or a plurality of a kind of the fallen object, a size of the fallen object, color of the fallen object, and the like. The kind of a fallen object is, for example, one or a plurality of wood, a package, and the like.

As a technique for detecting a road state as described above, a general technique such as pattern matching and a learned learning model to which machine learning has been applied, may be used.

When a learning model is used, the analysis unit 123 detects a road state by, for example, inputting a frame image that the video acquisition unit 121 acquires into a learned learning model to which machine learning for detecting a road state has been applied. In the machine learning, for example, supervised learning that uses, as input data, training data in which an image having captured a road is labeled is preferably performed.

In addition, the analysis unit 123 detects a predetermined event on a road, based on a detected road state. The event is one or a plurality of (1) congestion of vehicles, (2) reverse driving of a vehicle, (3) low-velocity travel of a vehicle, (4) stopping of a vehicle, (5) a fallen object, and (6) zigzag travel. Note that, the event is not limited to the events described above.

(1) The congestion is, for example, detected by a condition requiring a line of vehicles constituted of a vehicle performing low-velocity travel or a vehicle repeating stop and go to have a length equal to or greater than or a predetermined distance and to continue for a predetermined time length or more. The low-velocity travel herein is travel at a velocity less than or equal to a predetermined velocity.

(2) The reverse driving of a vehicle is, for example, detected by using a condition constituted of the following (2-A) and (2-B). (2-A) is a condition requiring a travel direction to be defined for a target road or each lane constituting the road in advance. (2-B) is a condition requiring a travel direction of a vehicle and a travel direction defined for a road or a lane on which the vehicle is traveling to differ from each other by an angle exceeding a predetermined angle (for example, 90 degrees). Reverse driving of a vehicle is detected when both (2-A) and (2-B) are satisfied, and reverse driving of a vehicle is not detected when at least one of (2-A) and (2-B) is not satisfied.

(3) The low-velocity travel of a vehicle is, for example, detected by a condition requiring a vehicle to be continuously traveling at a velocity equal to or less than a predetermined velocity for a predetermined time length or more. The predetermined velocity herein may be the same as or different from the predetermined velocity defining low-velocity travel at the time of congestion in (1).

(4) The stopping of a vehicle is, for example, detected by a condition requiring a vehicle to be continuously stopping (a vehicle position is within a predetermined range) for a predetermined time length or more.

(5) The fallen object is, for example, detected by using as a condition one or both of (5-A) requiring an object other than a vehicle to exist on the road and (5-B) requiring a predetermined number or more of vehicles to perform temporary lane changes with respect to a common range. A fallen object is detected when either of (5-A) and (5-B) is satisfied, and a fallen object is not detected when neither (5-A) nor (5-B) is satisfied.

The temporary lane change is to, after changing a lane, return to an original lane within a predetermined distance or within a predetermined time. Since, in general, a vehicle travels avoiding a fallen object, it is estimated that a fallen object exists in a range that a plurality of vehicles avoid in common. Therefore, a fallen object can be detected by using (5-B).

(6) The zigzag travel is, for example, detected by a condition requiring a vehicle to repeat temporary lane change a predetermined number or more of times. The temporary lane change is, as described above, to, after changing a lane, return to the original lane within a predetermined distance or within a predetermined time.

When the analysis unit 123 detects a road state and an event, the analysis unit 123 generates analysis information including a detected road state and event as an analysis result.

FIG. 7 is a diagram illustrating a configuration example of analysis information according to the first example embodiment. The analysis information is information in which an event and state accompanying information are associated with a detected road state. The event is information indicating an event being detected based on an associated road state, and examples of the event include "congestion", "reverse driving", and the like. The state accompanying information includes a frame image being used to detect an associated road state and image accompanying information being associated with the frame image in image information.

Note that, the analysis information is only required to include at least an analysis result, and is not limited to the definition described above. The analysis information may, for example, include only one of a road state and an event, and may be appropriately changed according to a content or the like of analysis that the analysis unit 123 performs.

The transmission unit 124 transmits information based on a result of determination. The information based on a result of determination is, for example, either analysis information or detection information. The detection information is information indicating that a frame image not being an analysis target is detected.

Specifically, for example, the transmission unit 124 includes a first transmission unit 124*a* and a second transmission unit 124*b*, as illustrated in FIG. 6.

The first transmission unit 124*a* transmits analysis information relating to a frame image being determined to be an analysis target. That is, the first transmission unit 124*a* is one example of a means for transmitting an analysis result of at least one frame image being determined to be an analysis target.

The first transmission unit 124*a* according to the present example embodiment transmits all pieces of analysis information relating to a frame image being determined to be an analysis target.

Note that, the first transmission unit 124*a* may transmit, among all pieces of analysis information, some pieces of the analysis information such as a piece of analysis information relating to a frame image at a predetermined time interval.

When at least one frame image is determined not to be an analysis target, the second transmission unit 124*b* transmits detection information with respect to the at least one frame image. That is, the second transmission unit 124*b* is one example of a means for transmitting detection information indicating that a frame image not being an analysis target is detected.

When a plurality of frame images are determined not to be an analysis target, the second transmission unit 124*b* according to the present example embodiment transmits detection information with respect to each of the plurality of frame images.

The detection information is, as described above, information indicating that a frame image not being an analysis target is detected. The detection information may include information relating to a frame image being used to determine that the frame image is not an analysis target.

The information relating to a frame image may include at least one of the following (1) to (3).

(1) capturing apparatus identification information for identifying a capturing apparatus that captured the frame image (2) at least one of a frame image and the reference image that were used for the determination (3) deviation information relating to a deviation of an area captured in the frame image.

The deviation information is, for example, information indicating an extent of a deviation of an area captured in a frame image (a capturing area of the capturing apparatus 101) with respect to an area captured in the reference image (a reference area). Specifically, for example, the deviation information is at least one of a degree of similarity that the comparison unit 122*b* derives, an indicator represented by symbols or the like that are associated with the degree of similarity at multiple levels, and the like.

Functional Configuration Example of Second Information Processing Apparatus 103

Figure 8:
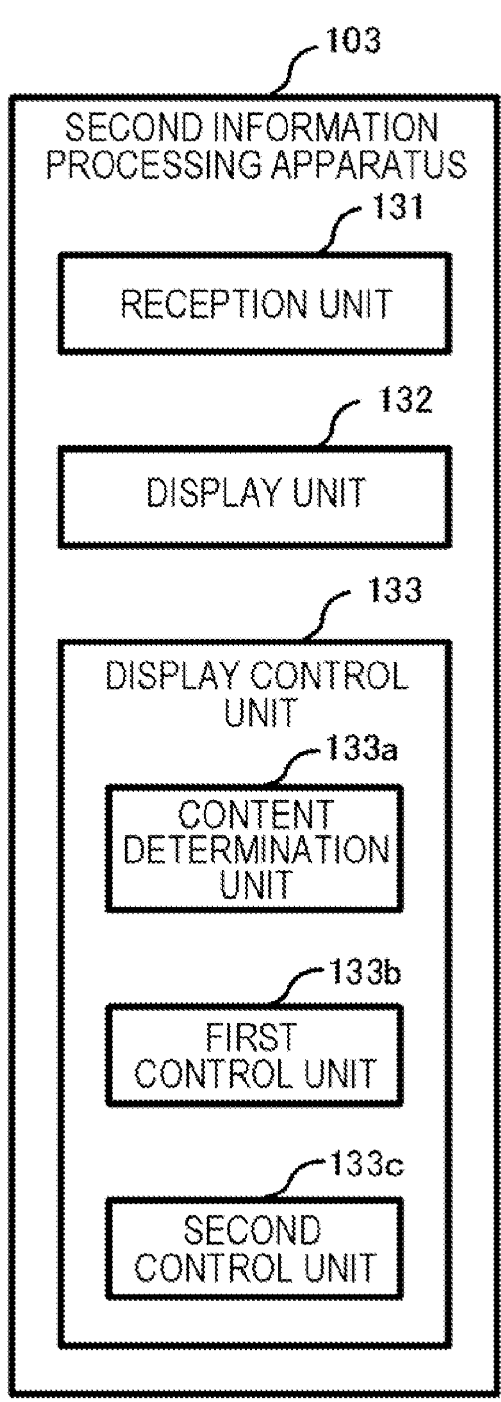
FIG. 8 is a diagram illustrating a functional configuration example of a second information processing apparatus according to the first example embodiment.

FIG. 8 is a diagram illustrating a functional configuration example of the second information processing apparatus 103 according to the first example embodiment. The second information processing apparatus 103 is an apparatus that displays an image for surveillance of a road. The second information processing apparatus 103 includes a reception unit 131, a display unit 132, and a display control unit 133.

The reception unit 131 receives information transmitted from the transmission unit 124. The reception unit 131, for example, receives analysis information or detection information relating to at least one frame image. The reception unit 131 according to the present example embodiment receives analysis information or detection information relating to all frame images.

The display unit 132 displays various types of information under control of the display control unit 133.

The display control unit 133 causes the display unit 132 to display information based on a result of determination, depending on information being received by the reception unit 131. That is, the display control unit 133 is one example of a means for causing a display means to display information based on a result of determination.

Specifically, for example, the display control unit 133 includes a content determination unit 133*a*, a first control unit 133*b*, and a second control unit 133*c*, as illustrated in FIG. 8.

The content determination unit 133*a*, in a case where the reception unit 131 receives information, determines content of the information. The content determination unit 133*a*, for example, determines which of analysis information and detection information the information being received by the reception unit 131 is.

The first control unit 133*b*, in a case where the content determination unit 133*a* determines that analysis information is received, causes the display unit 132 to display the analysis information. The analysis information is, as evident in the foregoing description, information relating to a frame image being determined to be an analysis target, and includes an analysis result of the frame image. That is, the first control unit 133*b* is one example of a means for causing the display means to display an analysis result of at least one frame image being determined to be an analysis target.

The first control unit 133*b* according to the present example embodiment causes the display unit 132 to display all pieces of analysis information relating to a frame image being determined to be an analysis target. The first control unit 133*b*, in a case of causing the display unit 132 to display analysis information, preferably causes the display unit 132 to display, among pieces of information included in the analysis information, at least a portion or all of an analysis result.

Note that, the first control unit 133*b* may cause the display unit 132 to display, among all pieces of the analysis information, some pieces of the analysis information such as analysis information relating to a frame image at a predetermined time interval.

The second control unit 133*c*, in a case where the content determination unit 133*a* determines that detection information is received, causes the display unit 132 to display the detection information. That is, the second control unit 133*c* is one example of a means for causing the display unit 132 to display detection information indicating that a frame image not being an analysis target is detected.

The second control unit 133*c* according to the present example embodiment, in a case where detection information relating to a plurality of frame images is received, causes the display unit 132 to display all pieces of the detection information.

In addition, the second control unit 133*c* may, in a case where detection information includes a frame image and a reference image, cause the display unit 132 to display the frame image and the reference image side by side.

A functional configuration example of the road surveillance system 100 according to the first example embodiment has hitherto been described. Hereinafter, a physical configuration example of the road surveillance system 100 according to the first example embodiment will be described.

Physical Configuration Example of Road Surveillance System 100

The road surveillance system 100 physically includes, for example, the capturing apparatus 101, the first information processing apparatus 102, and the second information processing apparatus 103.

Note that, a physical configuration of the road surveillance system 100 is not limited to the configuration described above. For example, functions that the capturing apparatus 101 and two information processing apparatuses 102 and 103 described in the present example embodiment may be physically included in one apparatus, or may be separately included in each of a plurality of apparatuses in a manner different from the present example embodiment. When a function of transmitting or receiving information among the apparatuses 101 to 103 according to the present example embodiment via the network N is physically incorporated in a common apparatus, information is preferably transmitted or received via an internal bus or the like in place of the network N.

Physical Configuration Example of Capturing Apparatus 101

FIG. 9 is a diagram illustrating a physical configuration example of the capturing apparatus 101 according to the first example embodiment. The capturing apparatus 101 physically includes, for example, a bus 1010, a processor 1020, a memory 1030, a storage device 1040, a network interface 1050, a user interface 1060, and a camera 1070.

The bus 1010 is a data transmission path for the processor 1020, the memory 1030, the storage device 1040, the network interface 1050, the user interface 1060, and the camera 1070 to transmit and receive data to and from one another. However, a method for connecting the processor 1020 and the like to one another is not limited to bus connection.

The processor 1020 is a processor being achieved by a central processing unit (CPU), a graphics processing unit (GPU), or the like.

The memory 1030 is a main storage apparatus being achieved by a random access memory (RAM) or the like.

The storage device 1040 is an auxiliary storage apparatus being achieved by a hard disk drive (HDD), a solid state drive (SSD), a memory card, a read only memory (ROM), or the like. The storage device 1040 stores a program module for achieving each function of the capturing apparatus 101. The processor 1020 reading each program module in the memory 1030 and executing the program module causes each function corresponding to the program module to be achieved.

The network interface 1050 is an interface for connecting the capturing apparatus 101 to the network N.

The user interface 1060 is a touch panel, a keyboard, a mouse, or the like that serves as an interface for a user to input information, and a liquid crystal panel, an organic electro-luminescence (EL) panel, or the like that serves as an interface for providing information to a user.

The camera 1070 captures a subject, such as a road, and generates an image of the subject. The capturing apparatus 101 is, for example, installed on a roadside, at a position above a road, or the like in such a way that the camera 1070 can capture a predetermined place on the road.

Note that, the capturing apparatus 101 may accept input from a user and provide information to a user, via an external apparatus (for example, the first information processing apparatus 102 or the second information processing apparatus 103) connected to the network N. In this case, the capturing apparatus 101 does not have to include the user interface 1060.

Physical Configuration Example of First Information Processing Apparatus 102 and Second Information Processing Apparatus 103

FIG. 10 is a diagram illustrating a physical configuration example of the first information processing apparatus 102 according to the first example embodiment. The first information processing apparatus 102 physically includes, for example, a bus 1010, a processor 1020, a memory 1030, a storage device 1040, and a network interface 1050 similar to those of the capturing apparatus 101. The first information processing apparatus 102 further physically includes, for example, an input interface 2060 and an output interface 2070.

However, the storage device 1040 of the first information processing apparatus 102 stores a program module for achieving each function of the first information processing apparatus 102. In addition, the network interface 1050 of the first information processing apparatus 102 is an interface for connecting the first information processing apparatus 102 to the network N.

The input interface 2060 is an interface for a user to input information, and includes, for example, a touch panel, a keyboard, a mouse, or the like. The output interface 2070 is an interface for providing information to a user, and includes, for example, a liquid crystal panel, an organic EL panel, or the like.

The second information processing apparatus 103 according to the first example embodiment is preferably physically configured in a similar manner to, for example, the first information processing apparatus 102. However, the storage device 1040 of the second information processing apparatus 103 stores a program module for achieving each function of the second information processing apparatus 103. In addition, the network interface 1050 of the second information processing apparatus 103 is an interface for connecting the second information processing apparatus 103 to the network N.

The configuration example of the road surveillance system 100 according to the first example embodiment have hitherto been described. Hereinafter, an operation example of the road surveillance system 100 according to the first example embodiment will be described.

Operation Example of Road Surveillance System 100

The road surveillance system 100 executes road surveillance processing for surveillance of a road. The road surveillance processing includes, for example, capturing processing that the capturing apparatus 101 executes, first information processing that the first information processing apparatus 102 executes, and second information processing that the second information processing apparatus 103 executes. The processing described above will be described below with reference to the drawings.

Example of Capturing Processing According to First Example Embodiment

Figure 11:
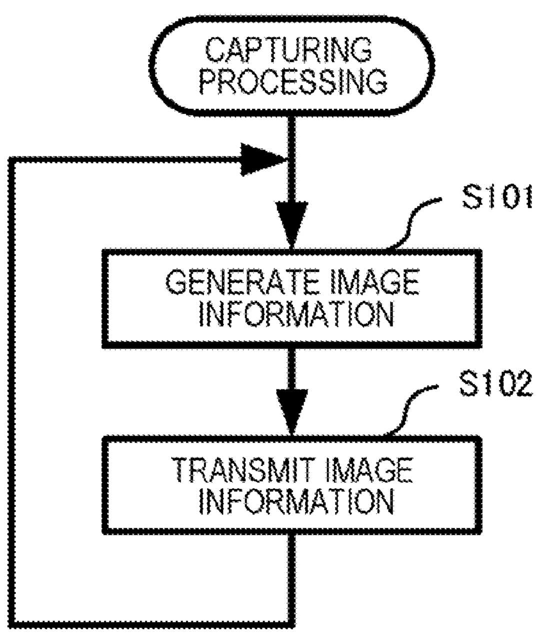
FIG. 11 is a flowchart illustrating one example of capturing processing according to the first example embodiment.

FIG. 11 is a flowchart illustrating one example of the capturing processing according to the first example embodiment. The capturing processing is processing for capturing a road. When the capturing apparatus 101, for example, accepts a start instruction from a user via the second information processing apparatus 103, the capturing apparatus 101 repeatedly executes the capturing processing at a predetermined frequency until the capturing apparatus 101 accepts an end instruction from a user. Note that, a method of starting or ending the capturing processing is not limited to the method described above.

The capturing apparatus 101 captures a road, and generates image information (step S101).

Specifically, for example, when the camera 1070 captures a predetermined place on the road, the capturing apparatus 101 generates image information including a frame image being acquired by the capturing.

FIG. 12 is a diagram illustrating one example of a road R to be captured.

The road R includes roadside strips RS1 and RS2 that are provided along both sides of the road R, and a separating zone SZ being provided at substantially the center along the road. The road R further includes lanes L1 and L2 that are provided between the roadside strip RS1 and the separating zone SZ, and lanes L3 and L4 that are provided between the roadside strip RS2 and the separating zone SZ. On side portions of the road R, road lamps M1 to M4 that illuminate the lanes L1 to L4, respectively, are installed.

An arrow illustrated by a dotted line in FIG. 12 indicates a travel direction prescribed for each lane. On the road R, vehicles C1, C2, C3, and C4 are traveling. An arrow illustrated by a solid line in FIG. 12 indicates a travel direction of the vehicle.

Figure 13:
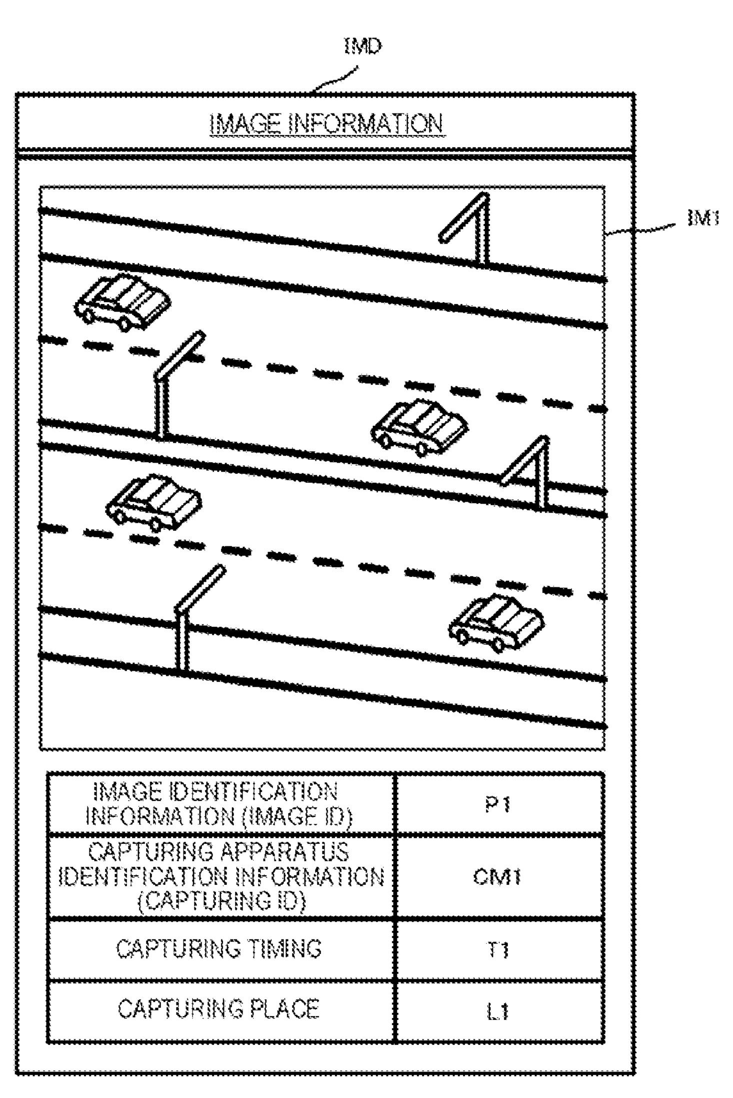
FIG. 13 is a diagram illustrating one example of image information IMD including a frame image IM1 that captures the road R illustrated in FIG. 12.

FIG. 13 is a diagram illustrating one example of image information IMD including a frame image IM1 that captures the road R illustrated in FIG. 12. The image information IMD illustrated in FIG. 13 associates image accompanying information with the frame image IM1. The image accompanying information illustrated in FIG. 13 associates an image ID "P1", a capturing ID "CM1", capturing timing "T1", and a capturing place "L1" with one another.

"P1" is an image ID assigned to the frame image IM1. The capturing apparatus 101, for example, preferably assigns an image ID to the image IM1 in accordance with a predetermined rule, and sets the image ID in the image information IMD.

"CM1" is a capturing ID of the capturing apparatus 101. The capturing apparatus 101, for example, preferably holds a capturing ID that a user sets in advance via the second information processing apparatus 103, and sets the capturing ID in the image information IMD.

"T1" indicates timing at which the frame image IM1 is captured. The capturing apparatus 101, for example, preferably includes a timer function, and sets a time at the time of capturing in the image information IMD as the capturing timing.

"L1" is information indicating a place at which the capturing apparatus 101 performs capturing. The capturing apparatus 101, for example, preferably holds in advance a capturing place (for example, an installation place of the capturing apparatus 101) that a user sets in advance via the second information processing apparatus 103, and sets the capturing place in the image information IMD.

FIG. 11 is referred to again.

The capturing apparatus 101 transmits image information generated in step S101 to the first information processing apparatus 102 (step S102), and returns to step S101.

Such capturing processing enables a video (that is, each of frame images being captured at a predetermined frame rate) to be transmitted to the first information processing apparatus 102 substantially in real time. Note that, step S102 may be executed at a preset time interval in such a way that image information is transmitted with respect to some of the captured frame images.

Example of First Information Processing According to First Example Embodiment

Figure 14:
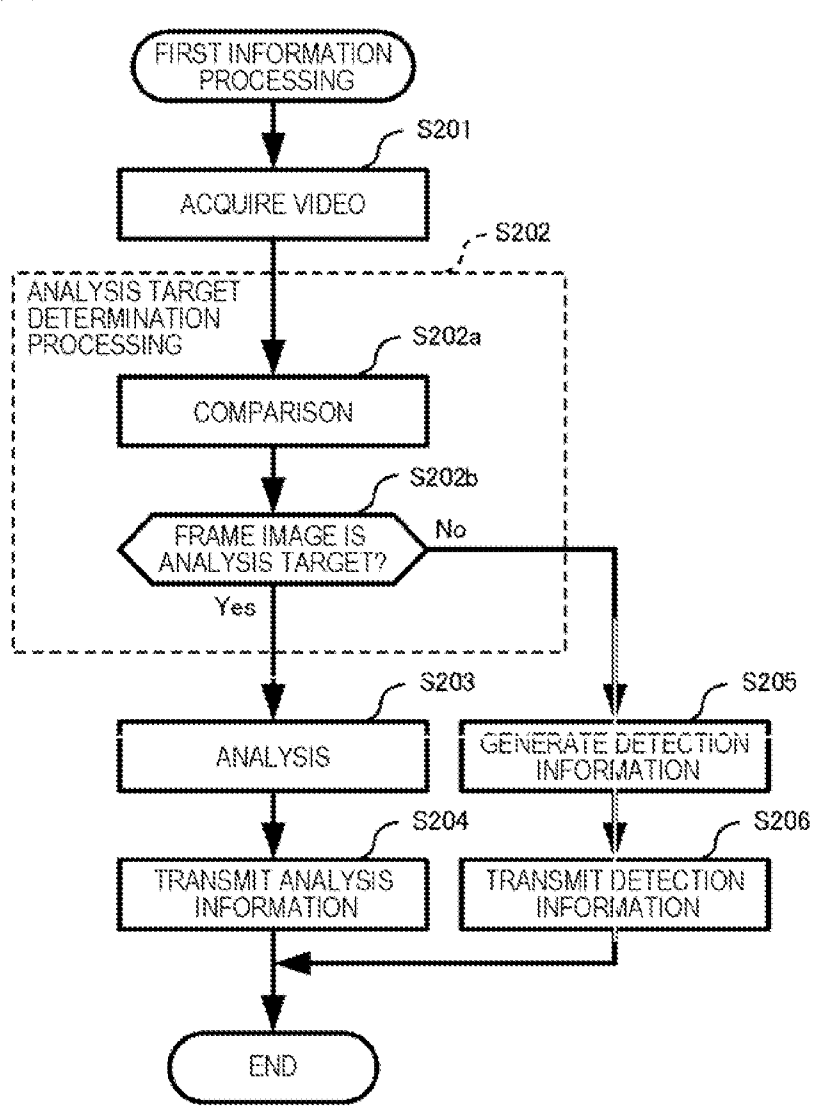
FIG. 14 is a flowchart illustrating one example of first information processing according to the first example embodiment.

FIG. 14 is a flowchart illustrating one example of the first information processing according to the first example embodiment. The first information processing is processing for analyzing a video that captures a road. When the first information processing apparatus 102 accepts a start instruction from a user via the second information processing apparatus 103, the first information processing apparatus 102, for example similarly to the capturing apparatus 101, repeatedly executes the first information processing until the first information processing apparatus 102 accepts an end instruction from a user. Note that, a method of starting or ending the first information processing is not limited to the method described above.

The video acquisition unit 121 acquires a video that captures a road (step S201).

Specifically, for example, the video acquisition unit 121 acquires image information from the capturing apparatus 101 in real time. Because of this configuration, the video acquisition unit 121 acquires, in real time, a frame image that captures the road.

The target determination unit 122 determines, based on a result of comparison between a frame image being included in the image information acquired in step S201 and a reference image and a first criterion, whether the frame image is an analysis target (step S202).

Specifically, for example, as illustrated in FIG. 14, the comparison unit 122*b* compares the frame image acquired in step S201 with the reference image stored in the reference image storage unit 122*a* (step S202*a*).

Figure 15:
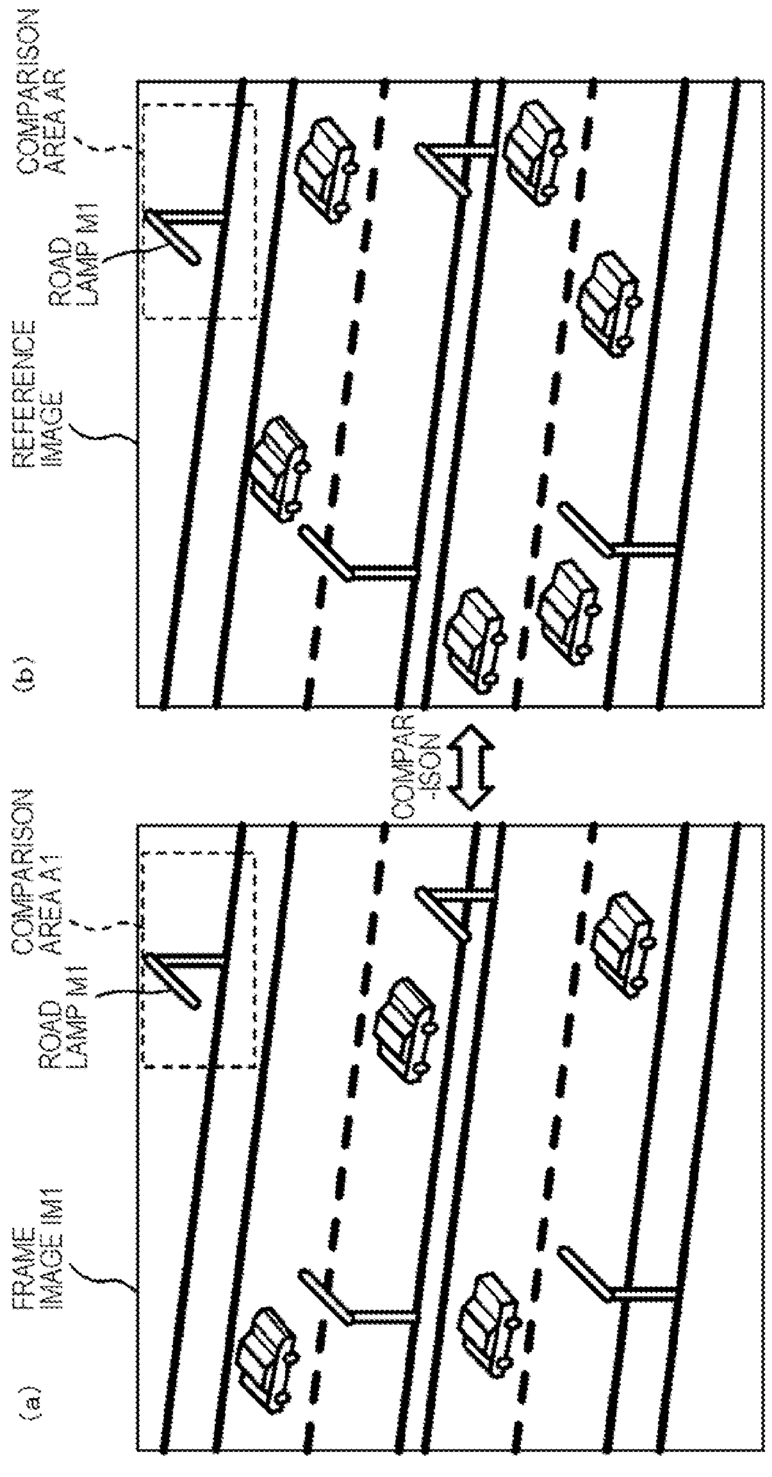
FIG. 15 is diagrams illustrating one example of the frame image IM1 and a reference image to be compared with each other.

FIG. 15 is a diagram illustrating one example of the frame image IM1 and the reference image to be compared with each other. FIG. 15A illustrates the frame image IM1, and FIG. 15B illustrates the reference image. The reference image is, for example, a frame image that was generated when the capturing apparatus 101 captured the road R in the past.

The comparison unit 122*b* acquires image feature values of each of a comparison area A1 and a comparison area AR that are set in a common range of each of the frame image IM1 and the reference image. The common range means that positions (pixel positions) of the comparison area A1 and the comparison area AR defined with respect to each of the frame image IM1 and the reference image are common.

As a technique for acquiring an image feature value, a general technique may be used, and, for example, a learned learning model to which machine learning has been applied is preferably used. In this case, the comparison unit 122*b* derives an image feature value of the comparison area A1 by inputting the comparison area A1 into a learned learning model to which machine learning for detecting an image feature value (for example, an edge) of the comparison area has been applied. With regard to the comparison area AR, an image feature value of the comparison area AR can also be derived by inputting the comparison area AR into the learning model in a similar manner. In the machine learning, for example, supervised learning that uses, as input data, training data in which an image having captured a road is labeled is preferably performed.

Then, the comparison unit 122*b* derives a degree of similarity between image feature values of the comparison area A1 and the comparison area AR.

Note that, a technique for deriving a degree of similarity between the frame image IM1 and the reference image is not limited to the technique described above, and a general technique, such as pattern matching, may be used.

In this configuration, although the comparison area AR may be the whole or an appropriate portion of the reference image, the comparison area AR is desirably set to, in the reference image, a portion in which no vehicle usually travels. When an area in which a vehicle travels is employed as the comparison area AR, there is a possibility that a degree of similarity being influenced by a traffic situation on the road R causes precision of the degree of similarity between a current capturing area of the capturing apparatus 101 and an area captured in the reference image to deteriorate. Setting a portion in which no vehicle usually travels as the comparison area AR and comparing the comparison area AR and the comparison area A1 with each other that are located in a common range enable a degree of similarity being scarcely influenced by a traffic situation on the road R to be acquired.

FIG. 14 is referred to again.

The first determination unit 122*c* determines, based on a degree of similarity being a result of comparison in step S202*a* and the first criterion, whether the frame image is an analysis target (step S202*b*).

For example, the comparison area A1 and the comparison area AR illustrated in FIG. 15 are substantially the same. Therefore, a degree of similarity between the comparison area A1 and the comparison area AR is, for example, equal to or greater than a threshold value included in the first criterion. In this case, since the first criterion according to the present example embodiment is satisfied, the first determination unit 122*c* determines that the frame image IM1 is an analysis target.

In contrast, when the first criterion according to the present example embodiment is not satisfied, the first determination unit 122*c* determines that the frame image IM1 is not an analysis target.

Figure 16:
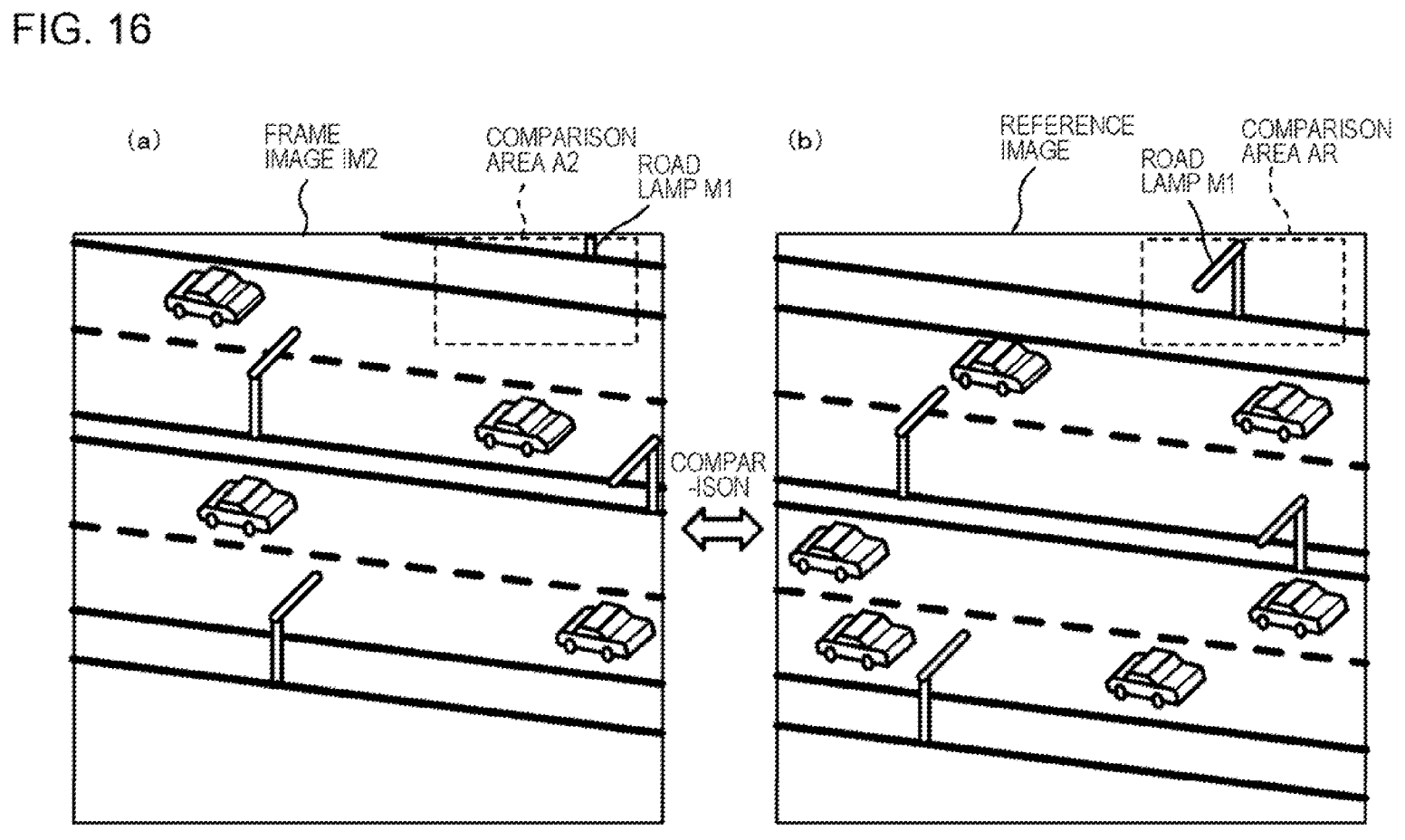

FIG. 16 is a diagram illustrating another example of a frame image IM2 and the reference image to be compared with each other. FIG. 16A illustrates the frame image IM2, and FIG. 16B illustrates the reference image being the same as the reference image in FIG. 15B. The frame image IM2 is an example of an image in which the capturing area of the capturing apparatus 101 is deviated to an area on a lower left side of the capturing area in FIG. 15A.

A comparison area A2 and the comparison area AR that are set in a common range of each of the frame image IM2 and the reference image illustrated in FIG. 16 are different from each other. A degree of similarity between the comparison area A2 and the comparison area AR is, for example, less than the threshold value included in the first criterion. In this case, since the first criterion according to the present example embodiment is not satisfied, the first determination unit 122*c* determines that the frame image IM2 is not an analysis target.

In general, there are some cases where a direction of the capturing apparatus 101 changes due to accidental contact with the capturing apparatus 101 in maintenance work of the capturing apparatus 101 and, as a result, the capturing area of the capturing apparatus 101 changes.

For example, when a road or a lane is recognized with the position of the road or the lane deviated, there is a possibility that reverse driving of a vehicle is erroneously detected. For example, when, on a two-lane road the travel directions of which are opposite to each other, one lane is recognized as another lane, there is a possibility that a vehicle being traveling on the one lane in reality is recognized to be traveling on the another lane. As a result, even when a vehicle is traveling in a correct direction on the one road or lane, there is a possibility that the vehicle is determined to be traveling in a reverse direction.

In addition, there are some cases where, for example, a value for converting a length of a predetermined portion in a frame image into an actual distance is set, and vehicle velocity or the like is detected by using the set value. In such a case, when the direction of the capturing apparatus 101 changes, the predetermined portion in the image changes, and there is a possibility that the length of the predetermined portion does not match the set actual distance. As a result, there is a possibility that wrong vehicle velocity is detected.

As described above, when an area captured in a frame image is deviated from a preset capturing area, there is a possibility that an error occurs to an analysis result.

Since, when a result of comparison in step S202*a* does not satisfy the first criterion, the area captured in the frame image is deviated from the preset capturing area, there is a possibility that an error occurs to the analysis result. Therefore, when the first criterion is not satisfied, the first determination unit 122*c* determines that the frame image IM2 is not an analysis target.

FIG. 14 is referred to again.

When a frame image is determined to be an analysis target (step S202*b*; Yes), the analysis unit 123 analyzes the frame image, and generates analysis information including at least an analysis result (step S203). The first transmission unit 124*a* transmits the analysis information generated in step S203 to the second information processing apparatus 103 (step S204), and ends the first information processing.

When a frame image is determined not to be an analysis target (step S202*b*; No), the second transmission unit 124*b* generates detection information relating to the frame image (step S205). The second transmission unit 124*b* transmits the detection information generated in step S205 to the second information processing apparatus 103 (step S206), and ends the first information processing.

The first information processing as described above enables analysis to be performed by using a frame image in which a proper capturing area is captured. In addition, it is possible to transmit an analysis result by using a frame image in which a proper capturing area is captured to the second information processing apparatus 103. Further, when a proper capturing area is not captured in the frame image, transmitting detection information to the second information processing apparatus 103 enables a user of the second information processing apparatus 103 to be informed that a frame image not being an analysis target is detected.

Figure 17:
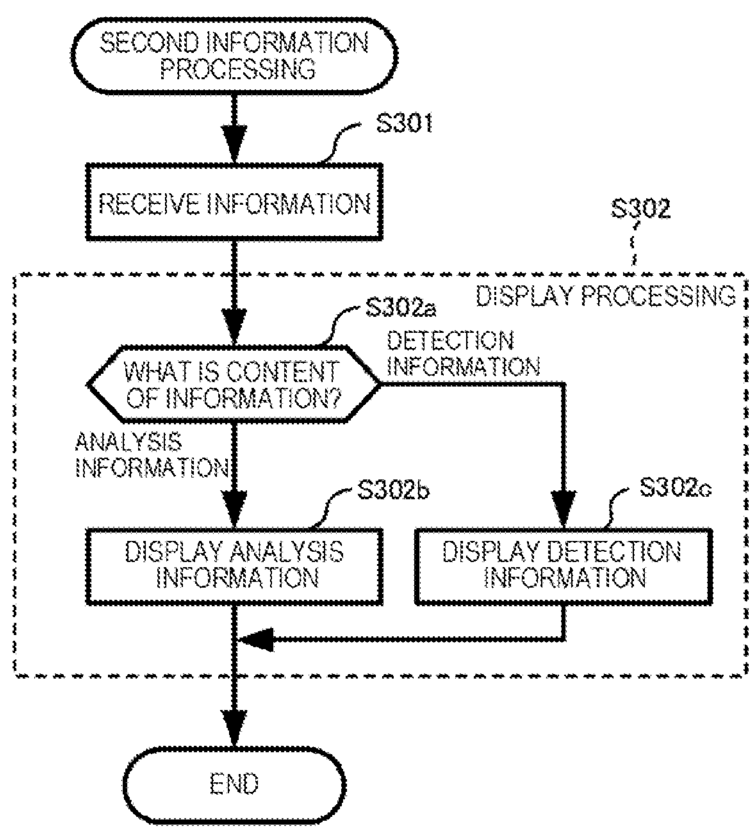
FIG. 17 is a flowchart illustrating one example of second information processing according to the first example embodiment.

Example of Second Information Processing According to First Example Embodiment FIG. 17 is a flowchart illustrating one example of the second information processing according to the first example embodiment. The second information processing is processing for displaying an image for surveillance of a road.

When the second information processing apparatus 103, for example, accepts a start instruction from a user, the second information processing apparatus 103 transmits the start instruction to the capturing apparatus 101 and the first information processing apparatus 102, as well as starting the second information processing. Then, when the second information processing apparatus 103, for example, accepts an end instruction from a user, the second information processing apparatus 103 transmits the end instruction to the capturing apparatus 101 and the first information processing apparatus 102, as well as ending the second information processing. That is, when the second information processing apparatus 103, for example, accepts a start instruction from a user, the second information processing apparatus 103 repeatedly executes the second information processing until the second information processing apparatus 103 accepts an end instruction from a user. Note that, a method of starting or ending the second information processing is not limited to the method described above.

The reception unit 131 receives information transmitted from the transmission unit 124 (step S301).

Specifically, for example, the reception unit 131 receives analysis information or detection information transmitted in step S204 or S205 (refer to FIG. 14).

The display control unit 133 causes the display unit 132 to display information based on a result of determination according to the information received in step S301 (step S302).

Specifically, for example, as illustrated in FIG. 17, the content determination unit 133*a* determines which of analysis information and detection information a content of information received in step S301 is (step S302*a*).

When the content of the information is determined to be analysis information (step S302*a*; analysis information), the first control unit 133*b* causes the display unit 132 to display the analysis information received in step S301 (step S302*b*), and ends the second information processing.

Figure 18:
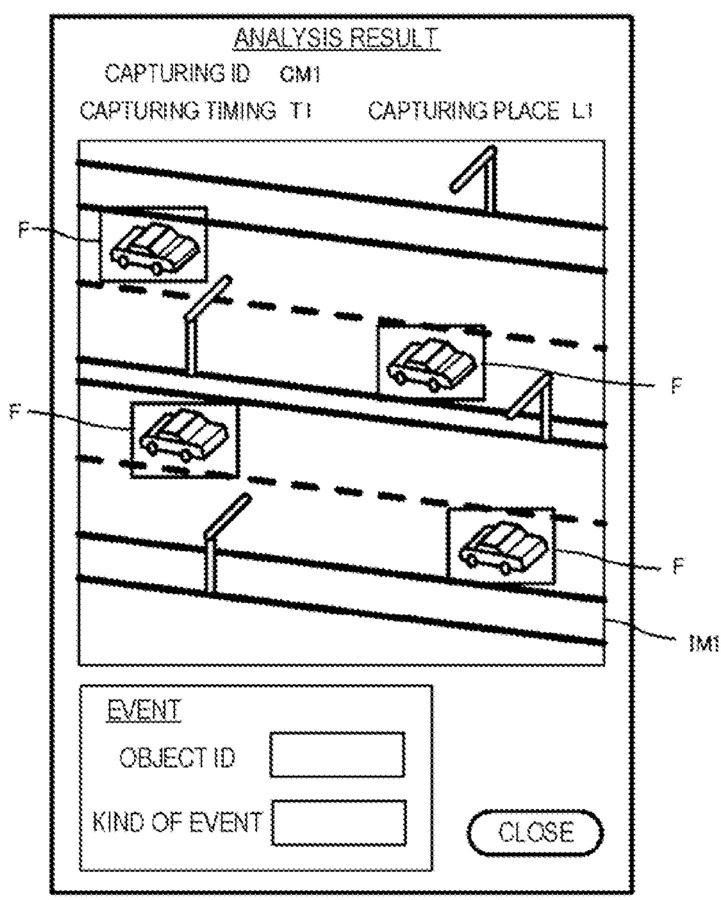
FIG. 18 is a diagram illustrating an example of a screen that displays an analysis result.

FIG. 18 is a diagram illustrating an example of a screen that displays an analysis result.

The screen illustrated in FIG. 18 includes the frame image IM1, the capturing ID of the capturing apparatus 101 that captures the frame image IM1, and the capturing timing and the capturing place of the frame image IM1. In addition, the screen illustrated in FIG. 18 includes frames F each of which is an indicator for identifying each of objects included in the frame image IM1. Each of the frames F is illustrated superimposed on the frame image IM1 in such a way as to surround each of the vehicles C1 to C4 being an object included in the frame image IM1. In addition, since no event is detected, an object ID and a kind of event that are examples of information relating to an event are left blank in the screen illustrated in FIG. 18.

The display control unit 133 causes the display unit 132 to continuously display the screen illustrated in FIG. 18. Then, when a predetermined operation, such as pointing a cursor at a "close" button in the screen and pressing a button of the mouse, is performed, the display control unit 133 ends the display of the screen, and ends the second information processing.

Note that, the screen that displays an analysis result is not limited to the screen described above and, for example, the information included in the screen and the like may be appropriately changed.

FIG. 17 is referred to again.

When the content of the information is determined to be detection information (step S302*a*; detection information), the second control unit 133*c* causes the display unit 132 to display the detection information received in step S301 (step S302*c*), and ends the second information processing.

Figure 19:
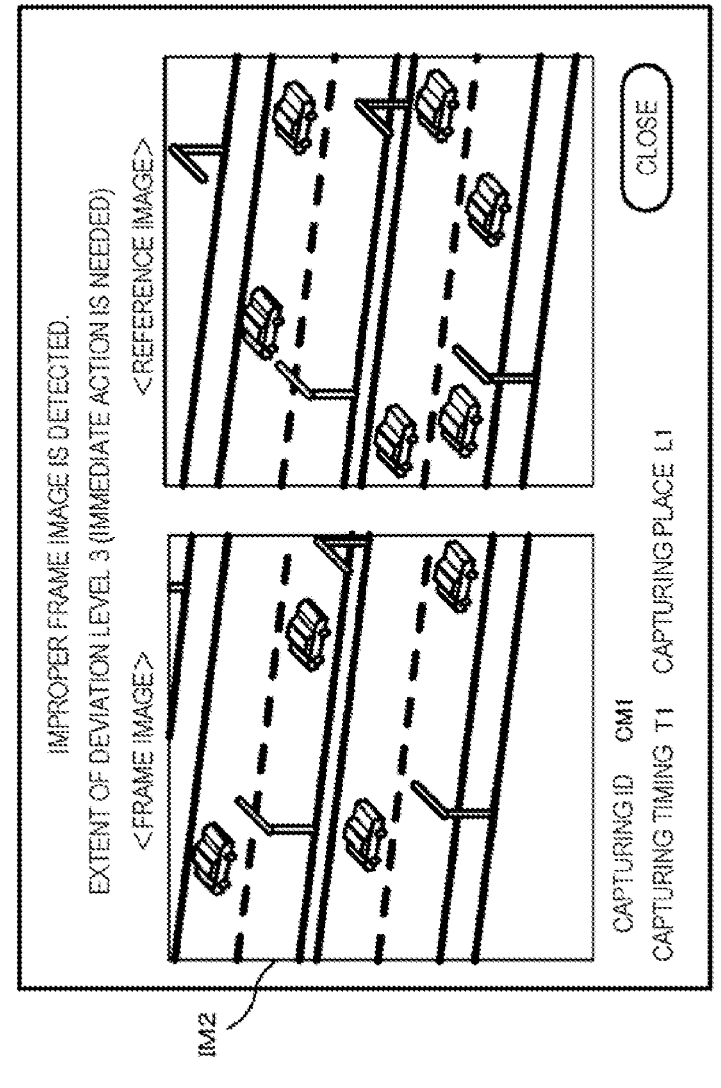
FIG. 19 is a diagram illustrating an example of a screen that displays detection information.

FIG. 19 is a diagram illustrating an example of a screen that displays detection information.

The screen illustrated in FIG. 19 includes the frame image IM2 and the reference image, an extent of a deviation of an area captured in the frame image IM2, the capturing ID of the capturing apparatus 101 that captures the frame image IM2, and the capturing timing and the capturing place of the frame image IM2.

The display control unit 133 causes the display unit 132 to continuously display the screen illustrated in FIG. 19. Then, when a predetermined operation, such as pointing a cursor at a "close" button in the screen and pressing a button of the mouse, is performed, the display control unit 133 ends the display of the screen, and ends the second information processing.

Note that, the screen that displays detection information is not limited to the screen described above and, for example, the information included in the screen and the like may be appropriately changed.

The second information processing as described above enables an analysis result acquired by using a frame image in which a proper capturing area is captured to be displayed on the display unit 132, and a user to be informed of the analysis result. In addition, when a proper capturing area is not captured in a frame image, it is possible to display detection information on the display unit 132, and thereby inform a user that a frame image not being an analysis target is detected.

Advantageous Effects

According to the first example embodiment described above, the road surveillance system 100 includes the video acquisition unit 121, the target determination unit 122, and the display control unit 133.

The video acquisition unit 121 acquires a video that captures a road. The target determination unit 122 determines, based on a result of comparison between at least one frame image constituting the video and a reference image and a first criterion, whether the at least one frame image is an analysis target.

The display control unit 133 causes a display unit to display information based on a result of the determination. The display control unit 133 includes the first control unit 133*b* and the second control unit 133*c*. The first control unit 133*b* causes the display unit 132 to display an analysis result of at least one frame image being determined to be an analysis target. The second control unit 133*c* causes the display unit 132 to display detection information indicating that a frame image not being an analysis target is detected.

Because of this configuration, it is possible to determine whether a frame image is an analysis target by using the first criterion, with respect to a frame image being an analysis target, display an analysis result using the frame image on the display unit 132, and inform a user of the analysis result. Thus, a user can refer to an appropriate analysis result based on a frame image serving as an analysis target, and perform surveillance of a road. Therefore, it becomes possible to support efficient road surveillance.

In addition, with respect to a frame image not being an analysis target, it is possible to display detection information on the display unit 132, and thereby inform a user that a frame image not being an analysis target is detected. A user who is made aware of the detection of a frame image not being an analysis target can take an action, such as correcting the direction of the capturing apparatus 101, based on the detection information, in such a way that an appropriate frame image is captured. Then, after the action, surveillance of the road can be performed based on an appropriate analysis result. Therefore, it becomes possible to support efficient road surveillance.

According to the first example embodiment, the target determination unit 122 determines, based on a result of comparison between an image feature value of at least one frame image and an image feature value of the reference image and the first criterion, whether the at least one frame image is an analysis target.

An image feature value can be easily derived by using a general technique. Thus, it is possible to easily determine whether a frame image is an analysis target. Therefore, it becomes possible to easily support efficient road surveillance.

According to the first example embodiment, an image feature value is a feature value that indicates an area captured in at least one frame image.

Use of an image feature value as described above enables whether an area captured in a frame image is deviated to an extent that the frame image does not serve as an analysis target to be determined. As a result, a user can refer to an appropriate analysis result based on a frame image serving as an analysis target, and perform surveillance of a road. In addition, the user can appropriately take an action to a frame image not being an analysis target, and subsequently thereby perform surveillance of the road, based on an appropriate analysis result. Therefore, it becomes possible to support efficient road surveillance.

According to the first example embodiment, the detection information includes information relating to a frame image being used to determine that the frame image is not an analysis target.

Since, because of this configuration, a user can be made aware of information relating to a frame image not being an analysis target, taking an action in such a way that an appropriate frame image is captured is facilitated. Therefore, it becomes possible to support efficient road surveillance.

According to the first example embodiment, the information relating to a frame image includes at least one of (1) capturing apparatus identification information for identifying a capturing apparatus that captures the frame image, (2) at least one of the frame image and the reference image that were used for the determination, and (3) deviation information relating to a deviation of an area captured in the frame image.

Since, because of this configuration, a user can be made aware of at least one of (1) to (3) described above, taking an action in such a way that an appropriate frame image is captured is facilitated. Therefore, it becomes possible to support efficient road surveillance.

According to the first example embodiment, when detection information includes a frame image and a reference image, the second control unit 133*c* causes the display unit 132 to display the frame image and the reference image side by side.

Because of this configuration, a user can easily compare a frame image and the reference image that are used to determine that the frame image is not an analysis target, and thereby easily estimate a factor causing the frame image to be determined not to be an analysis target. Thus, taking an action in such a way that an appropriate frame image is captured is facilitated. Therefore, it becomes possible to support efficient road surveillance.

According to the first example embodiment, the information processing apparatus 102 includes the video acquisition unit 121, the target determination unit 122, and the transmission unit 124.

The video acquisition unit 121 acquires a video that captures a road. The target determination unit 122 determines, based on a result of comparison between at least one frame image constituting the video and a reference image and a first criterion, whether the at least one frame image is an analysis target.

The transmission unit 124 transmits information based on a result of the determination. The transmission unit 124 includes the first transmission unit 124*a* and the second transmission unit 124*b*. The first transmission unit 124*a* transmits an analysis result of at least one frame image being determined to be an analysis target. The second transmission unit 124*b* transmits detection information indicating that a frame image not being an analysis target is detected.

Because of this configuration, it is possible to determine whether a frame image is an analysis target by using the first criterion, with respect to a frame image being an analysis target, transmit an analysis result using the frame image, and inform a user of the analysis result. Thus, a user can refer to an appropriate analysis result based on a frame image serving as an analysis target, and perform surveillance of a road. Therefore, it becomes possible to support efficient road surveillance.

In addition, with respect to a frame image not being an analysis target, it is possible to transmit detection information, and thereby inform a user that a frame image not being an analysis target is detected. A user who is made aware of the detection of a frame image not being an analysis target can take an action, such as correcting the direction of the capturing apparatus 101 based on the detection information, in such a way that an appropriate frame image is captured. Then, after the action, surveillance of the road can be performed based on an appropriate analysis result. Therefore, it becomes possible to support efficient road surveillance.

Second Example Embodiment

In general, there is a possibility that, even when a capturing area of a capturing apparatus 101 is appropriate, a captured frame image differs greatly depending on a capturing environment (for example, a period of time, weather, a season, or the like at a time of capturing). In such a case, when whether a frame image is an analysis target is determined by using a common reference image in different capturing environments, there is a possibility that incorrect determination is made.

In the present example embodiment, an example in which a reference image is selected from a plurality of candidate images and, by using the selected reference image, whether a frame image is an analysis target is determined will be described.

In the present example embodiment, to make the description concise, description of a component similar to a component in the first example embodiment will be appropriately omitted.

Configuration Example of Road Surveillance System According to Second Example Embodiment A road surveillance system according to a second example embodiment includes a first information processing apparatus including a target determination unit 222 that functionally replaces the target determination unit 122 according to the first example embodiment.

Figure 20:
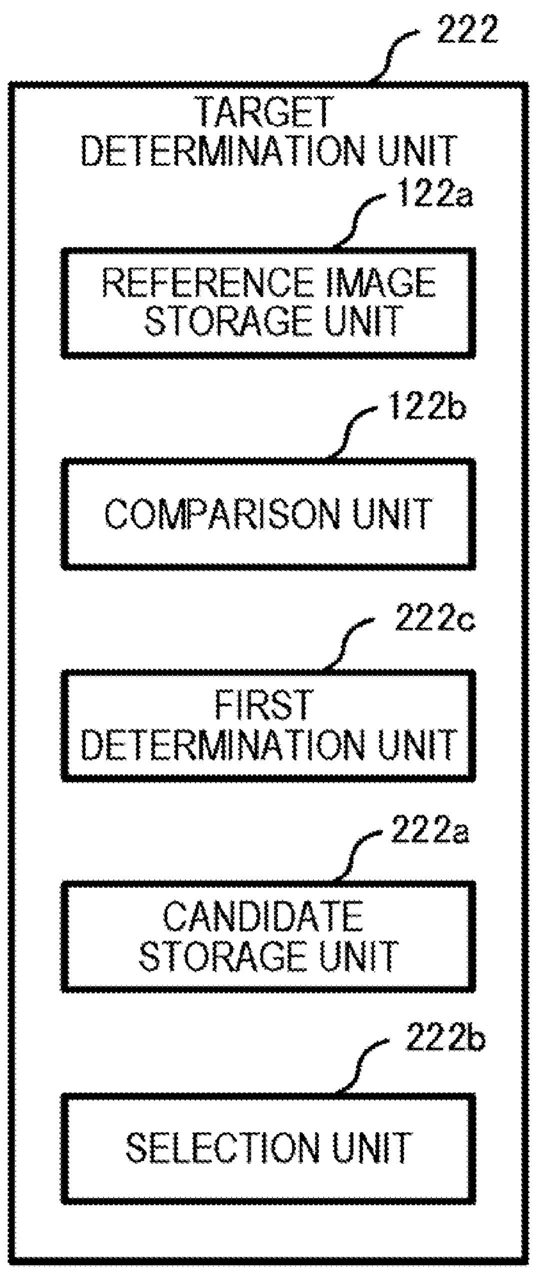
FIG. 20 is a diagram illustrating a functional configuration example of a target determination unit according to a second example embodiment.

FIG. 20 is a diagram illustrating a functional configuration example of the target determination unit 222 according to the second example embodiment. The target determination unit 222 includes a reference image storage unit 122*a* and a comparison unit 122*b* that are similar to those in the first example embodiment, and a first determination unit 222*c* that replaces the first determination unit 122*c* according to the first example embodiment. Further, the target determination unit 222 includes a candidate storage unit 222*a* and a selection unit 222*b*.

The first determination unit 222*c* includes a function similar to the function of the first determination unit 122*c* according to the first example embodiment. In addition to the above, the first determination unit 222*c* stores a frame image determined to satisfy a first criterion in the candidate storage unit 222*a* as a candidate image.

The first determination unit 222*c* preferably stores a frame image determined to satisfy the first criterion in the candidate storage unit 222*a* by associating a capturing environment of the frame image with the frame image.

The capturing environment of a frame image is an environment at a time when the frame image is captured, and includes, for example, an attribute of capturing timing of the frame image and a weather condition at the time when the frame image is captured. The attribute of capturing timing is, for example, at least one of a period of time, a season, and the like. The weather condition is, for example, at least one of sky condition, weather, and the like.

Note that, the capturing environment may be at least one of the attribute of capturing timing and the weather condition, and does not have to be limited thereto.

Frame images that are to be stored in the candidate storage unit 222*a* as candidate images may be all of the frame images that are determined to satisfy the first criterion, or may be some of the frame images that are determined to satisfy the first criterion.

When some of the frame images that are determined to satisfy the first criterion are stored in the candidate storage unit 222*a*, the some of the frame images are preferably determined from among the frame images that are determined to satisfy the first criterion in accordance with a predetermined rule. For example, the first determination unit 222*c* may store, among the frame images that are determined to satisfy the first criterion, a frame image at a predetermined time interval in the candidate storage unit 222*a*.

The candidate storage unit 222*a* is a storage unit in which a plurality of candidate images are stored in advance. With each of the plurality of candidate images, a capturing environment at a time when each candidate image is captured is preferably associated. The plurality of candidate images include images that are associated with different capturing environments.

The selection unit 222*b* selects a reference image from among a plurality of candidate images stored in the candidate storage unit 222*a* according to a predetermined selection condition.

The selection condition is a condition for selecting a reference image. The selection condition includes, for example, (1) a condition relating to a capturing environment (environmental condition), and (2) a condition relating to timing at which the reference image is switched (switching timing condition). Note that, the selection condition may include at least one of (1) the environmental condition and (2) the switching timing condition, and does not have to be limited to the condition.

(1) The environmental condition, for example, requires the reference image to be an image that fits a current (for example, a time when the latest frame image is captured) capturing environment. To "fit" means that, for example, a portion or all of the capturing environment associated with the reference image is the same as the capturing environment of the current frame image.

For example, the selection unit 222*b* selects a reference image from among one or a plurality of candidate images associated with a capturing environment common to at least one frame image.

(2) The switching timing condition is defined by using at least one of a time interval and an operation schedule. The operation schedule is a schedule of operation relating to at least one of a capturing apparatus 101, a first information processing apparatus 102, and a second information processing apparatus 103, and may be input by a user or may be acquired from a not-illustrated external apparatus.

For example, the selection unit 222*b* selects a reference image from among the plurality of candidate images at timing defined in the switching timing condition, that is, timing at which the reference image is switched.

With the exception of the conditions described above, the road surveillance system according to the present example embodiment is preferably functionally configured in a substantially similar manner to the road surveillance system 100 according to the first example embodiment. In addition, the road surveillance system according to the present example embodiment is preferably physically configured in a similar manner to the road surveillance system 100 according to the first example embodiment.

Operation Example of Road Surveillance System According to Second Example Embodiment The road surveillance system according to the present example embodiment, similarly to the road surveillance system according to the first example embodiment, executes road surveillance processing. The road surveillance processing according to the present example embodiment includes capturing processing and second information processing that are similar to those in the first example embodiment, and first information processing being different from that in the first example embodiment.

Figure 21:
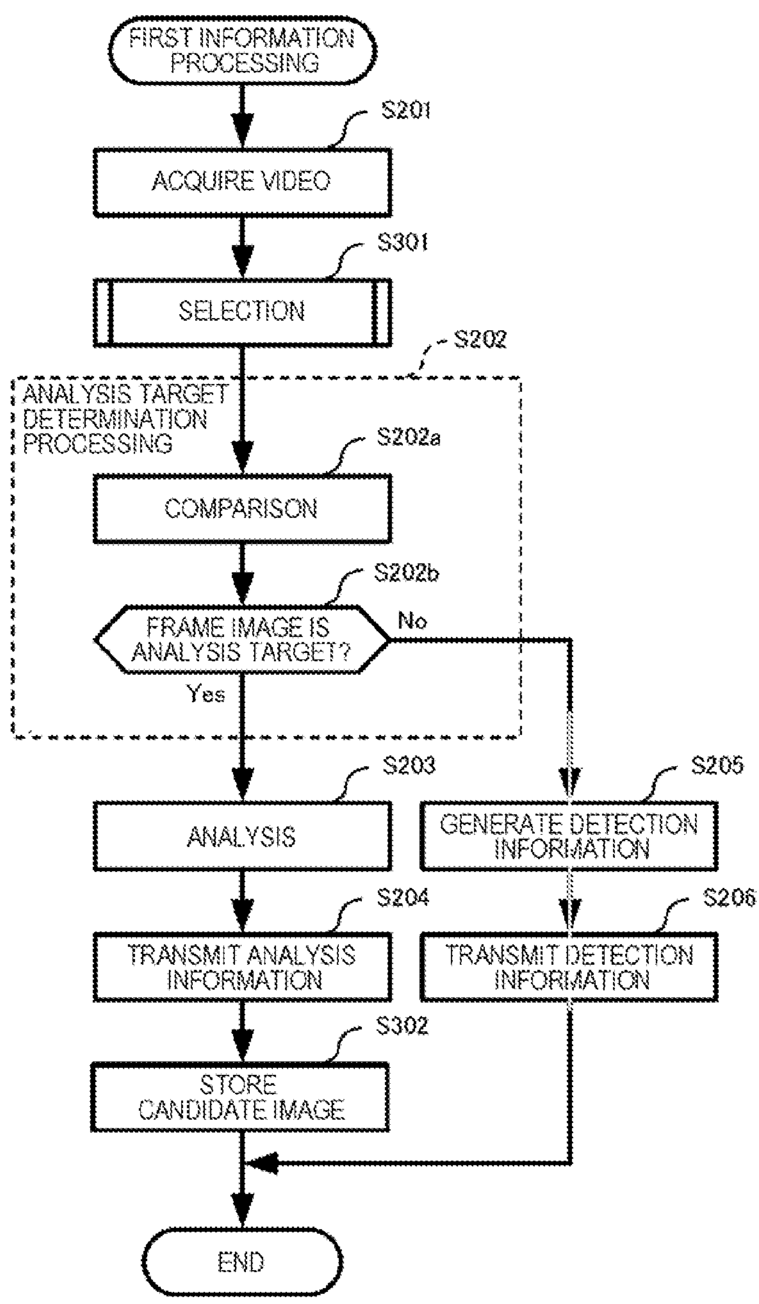
FIG. 21 is a flowchart illustrating one example of first information processing according to the second example embodiment.

FIG. 21 is a flowchart illustrating one example of the first information processing according to the second example embodiment. The first information processing according to the present example embodiment includes steps S201 to S206 that are similar to those in the first example embodiment. The first information processing according to the present example embodiment further includes step S301 being executed subsequently to step S201 and step S302 being executed subsequently to step S204. With the exception of the additional steps, the first information processing according to the present example embodiment may be similar to the first information processing according to the first example embodiment.

Subsequently to step S201, the selection unit 222*b* selects a reference image from among a plurality of candidate images stored in the candidate storage unit 222*a* according to a predetermined selection condition (step S301).

Figure 22:
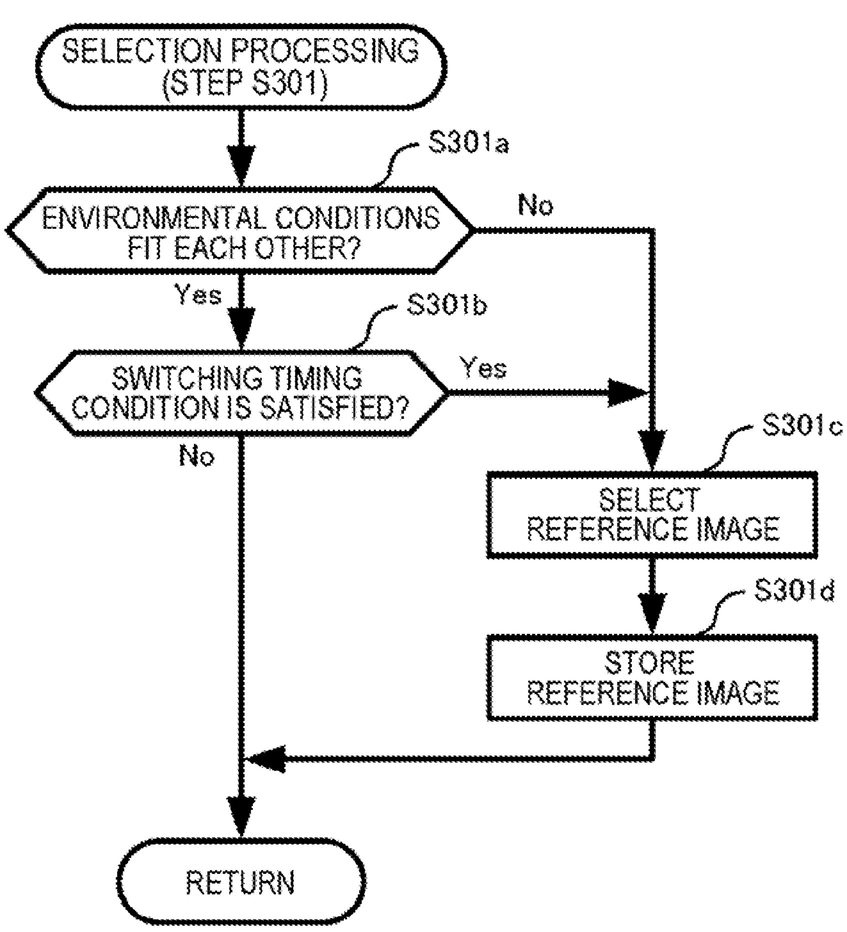
FIG. 22 is a flowchart illustrating one example of selection processing according to the second example embodiment.

FIG. 22 is a flowchart illustrating one example of selection processing (step S301) according to the second example embodiment.

The selection unit 222*b* determines whether the environmental conditions of a reference image and a frame image fit each other (step S301*a*).

Specifically, for example, with a reference image stored in the reference image storage unit 122*a* according to the present example embodiment, capturing timing of the reference image and a weather condition (for example, sky condition) at a time when the reference image is captured are associated. In addition, for example, with a frame image included in image information according to the present example embodiment, a weather condition (for example, sky condition) at a time when the frame image is captured is further associated.

The selection unit 222*b* determines whether the environmental condition associated with the reference image in the reference image storage unit 122*a* and the environmental condition associated with the frame image in the image information acquired in step S201 fit each other.

For example, when, with regard to the reference image and the frame image, capturing timing belongs to the same period of time and associated sky condition is the same, the selection unit 222*b* determines that the environmental conditions of the reference image and the frame image fit each other. The period of time is preferably defined in advance in a corresponding manner to, for example, daytime, nighttime, or the like. In addition, for example, when, with regard to the reference image and the frame image, capturing timing belongs to different periods of time or an associated sky condition is different, the selection unit 222*b* determines that the environmental conditions of the reference image and the frame image do not fit each other.

When the selection unit 222*b* determines that the environmental conditions fit each other (step S301*a*; Yes), the selection unit 222*b* determines whether the switching timing condition is satisfied (step S301*b*).

Specifically, for example, when the switching timing condition is defined by using time, the selection unit 222*b* preferably determines whether the current time is a time included in the switching timing condition. For example, when the current time is a time included in the switching timing condition, the selection unit 222*b* preferably determines that the switching timing condition is satisfied. When the current time is not a time included in the switching timing condition, the selection unit 222*b* preferably determines that the switching timing condition is not satisfied.

Note that, time included in the switching timing condition may be defined by duration. In addition, the selection unit 222*b* may determine whether the current time is a time included in the switching timing condition, based on whether the current time falls within a predetermined period with the time included in the switching timing condition as a criterion.

In addition, for example, when the switching timing condition is defined by using a time interval, the selection unit 222*b* preferably determines whether the switching timing condition is satisfied, based on an elapsed time from a time at which the current reference image was stored in the reference image storage unit 122*a* (storing time). For example, when the elapsed time is equal to or greater than the time interval, the selection unit 222*b* preferably determines that the switching timing condition is satisfied. When the elapsed time is less than the time interval, the selection unit 222*b* preferably determines that the switching timing condition is not satisfied. Note that, the storing time is preferably stored in, for example, the reference image storage unit 122*a*.

Further, for example, when the switching timing condition is defined by using an operation schedule, the selection unit 222*b* preferably determines whether the switching timing condition is satisfied, based on whether the current time is a predetermined time before an operation start time indicated in the operation schedule. For example, when the current time is the predetermined time before the operation start time, the selection unit 222*b* preferably determines that the switching timing condition is satisfied. When the current time has not reached a time the predetermined time before the operation start time, the selection unit 222*b* preferably determines that the switching timing condition is not satisfied.

When the selection unit 222*b* determines that the switching timing condition is not satisfied (step S301*b*; No), the selection unit 222*b* returns to the first information processing (refer to FIG. 21).

When the selection unit 222*b* determines that the environmental conditions do not fit each other (step S301*a*; No), or when the selection unit 222*b* determines that the switching timing condition is satisfied (step S301*b*; Yes), the selection unit 222*b* selects a reference image (step S301*c*).

Specifically, for example, the selection unit 222*b* selects a reference image from among a plurality of candidate images stored in the candidate storage unit 222*a*. On this occasion, the selection unit 222*b* selects, as a reference image, a candidate image the environmental condition associated with which fits the environmental condition of the current frame image from among the plurality of candidate images. In addition, when there are a plurality of candidate images the environmental conditions of which fit the environmental condition of the current frame image, the selection unit 222*b*, for example, selects a candidate image the capturing timing of which is closest to the current time (the latest candidate image) as a reference image.

The selection unit 222*b* stores the reference image selected in step S301*c* in the reference image storage unit 122*a* (step S301*d*), and returns to the first information processing (refer to FIG. 21).

FIG. 21 is referred to again.

Subsequently to step S204, the first determination unit 222*c* stores a frame image determined to satisfy the first criterion in the candidate storage unit 222*a* as a candidate image (step S302), and ends the first information processing.

Advantageous Effects

According to the second example embodiment described above, the road surveillance system further includes the selection unit 222*b* that selects a reference image from among a plurality of candidate images according to a selection condition defining a condition for selecting a reference image.

Since, because of this configuration, an appropriate image can be selected as a reference image from among a plurality of candidate images, it is possible to more appropriately determine whether a frame image is an analysis target. Therefore, it becomes possible to further support efficient road surveillance.

According to the second example embodiment, the selection condition includes at least one of (1) a condition relating to a capturing environment, and (2) a condition relating to timing at which the reference image is switched.

Since, because of this configuration, an appropriate image can be selected as a reference image from among a plurality of candidate images according to at least one of (1) an environmental condition and (2) a switching timing condition, it is possible to more appropriately determine whether a frame image is an analysis target. Therefore, it becomes possible to further support efficient road surveillance.

According to the second example embodiment, the selection condition includes a condition relating to a capturing environment. In addition, the plurality of candidate images include an image being associated with a different capturing environment. The selection unit 222*b* selects a reference image from among one or a plurality of candidate images associated with a capturing environment being common to the capturing environment of at least one frame image.

Since, because of this configuration, an appropriate image matching the capturing environment can be selected as a reference image, it is possible to more appropriately determine whether a frame image is an analysis target. Therefore, it becomes possible to further support efficient road surveillance.

According to the second example embodiment, the capturing environment includes at least one of an attribute of capturing timing and a weather condition.

In general, there is a possibility that frame images differ from one another depending on an attribute of capturing timing. For example, frame images sometimes differ from one another since brightness differs depending on a period of time. In addition, for example, frame images sometimes differ from one another since growth of trees and plants differs depending on a season. The same applies to the weather condition.

The capturing environment including at least one of an attribute of capturing timing and a weather condition enables an appropriate image that matches at least one of the attribute of capturing timing and the weather condition to be selected as a reference image. Thus, it is possible to more appropriately determine whether a frame image is an analysis target. Therefore, it becomes possible to further support efficient road surveillance.

According to the second example embodiment, the selection condition includes a condition relating to timing at which a reference image is switched. The selection unit 222*b* selects a reference image from among a plurality of candidate images at timing at which the reference image is switched.

Because of this configuration, it is possible to select an appropriate image as a reference image at predetermined timing. Thus, it is possible to more appropriately determine whether a frame image is an analysis target. Therefore, it becomes possible to further support efficient road surveillance.

According to the second example embodiment, the condition relating to the timing at which a reference image is switched is defined by using at least one of a time interval and an operation schedule.

Because of this configuration, it is possible to select an appropriate image as a reference image at a predetermined interval or at a time matching the operation schedule. Thus, it is possible to more appropriately determine whether a frame image is an analysis target. Therefore, it becomes possible to further support efficient road surveillance.

Third Example Embodiment

In the first example embodiment, when it is once determined that a first criterion is not satisfied, detection information is displayed. However, in some cases, for example, a bird or an insect around a lens is captured in a frame image, or a frame image is temporarily disturbed due to communication failure or the like. In such a case, even when a capturing area of a capturing apparatus 101 is proper, a degree of similarity between a frame image and a reference image becomes small and the frame image is to be determined not to be an analysis target. When, in a case where a frame image is temporarily determined not to be an analysis target, detection information is displayed as described above, there is a possibility that efficiency of road surveillance is caused to deteriorate.

In the present example embodiment, a configuration for, in order to suppress such display of detection information, reducing possibility that a frame image is temporarily determined not to be an analysis target will be described.

In the present example embodiment, to make the description concise, description of a component similar to a component in the first example embodiment will be appropriately omitted.

Configuration Example of Road Surveillance System According to Third Example Embodiment A road surveillance system according to a third example embodiment includes a first information processing apparatus including a target determination unit 322 that functionally replaces the target determination unit 122 according to the first example embodiment.

Figure 23:
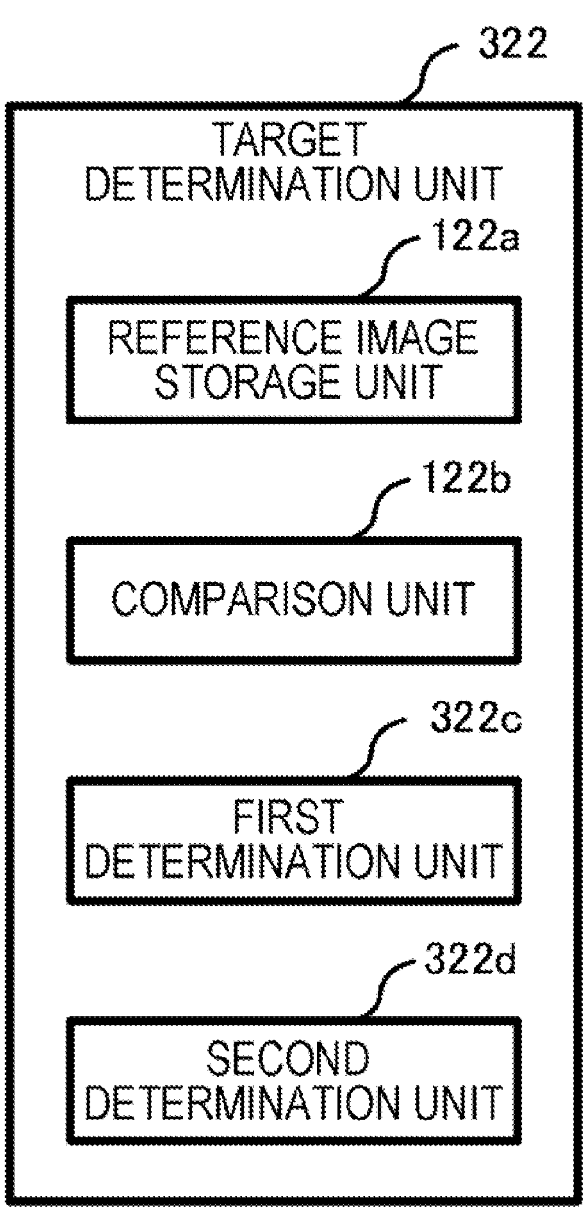
FIG. 23 is a diagram illustrating a functional configuration example of a target determination unit according to a third example embodiment.

FIG. 23 is a diagram illustrating a functional configuration example of the target determination unit 322 according to the third example embodiment. The target determination unit 322 includes a reference image storage unit 122*a* and a comparison unit 122*b* that are similar to those in the first example embodiment, and a first determination unit 322*c* that replaces the first determination unit 122*c* according to the first example embodiment. Further, the target determination unit 322 includes a second determination unit 322*d*.

The first determination unit 322*c*, similarly to the first determination unit 122*c* according to the first example embodiment, determines, with respect to each of a time series of frame images, whether a result of comparison performed by the comparison unit 122*b* satisfies a first criterion. However, the first determination unit 322*c* differs from the first determination unit 122*c* according to the first example embodiment in that the first determination unit 322*c* does not go so far as to determine whether each of the frame images is an analysis target, based on the determination result.

The second determination unit 322*d* determines, based on a determination result of the first determination unit 322*c* and a second criterion, whether each of the frame images is an analysis target. That is, the second determination unit 322*d* determines, based on a determination result of whether each of the time series of frame images satisfies the first criterion and the second criterion, whether each of the frame images is an analysis target.

The second criterion is defined by using at least one of the number of times, a frequency, and a ratio at which the time series of frame images are determined not to satisfy the first criterion.

With the exception of the determination processing described above, the road surveillance system according to the present example embodiment is preferably functionally configured in a substantially similar manner to the road surveillance system 100 according to the first example embodiment. In addition, the road surveillance system according to the present example embodiment is preferably physically configured in a similar manner to the road surveillance system 100 according to the first example embodiment.

Operation Example of Road Surveillance System According to Third Example Embodiment The road surveillance system according to the present example embodiment, similarly to the road surveillance system according to the first example embodiment, executes road surveillance processing. The road surveillance processing according to the present example embodiment includes capturing processing and second information processing that are similar to those in the first example embodiment, and first information processing being different from that in the first example embodiment.

Figure 24:
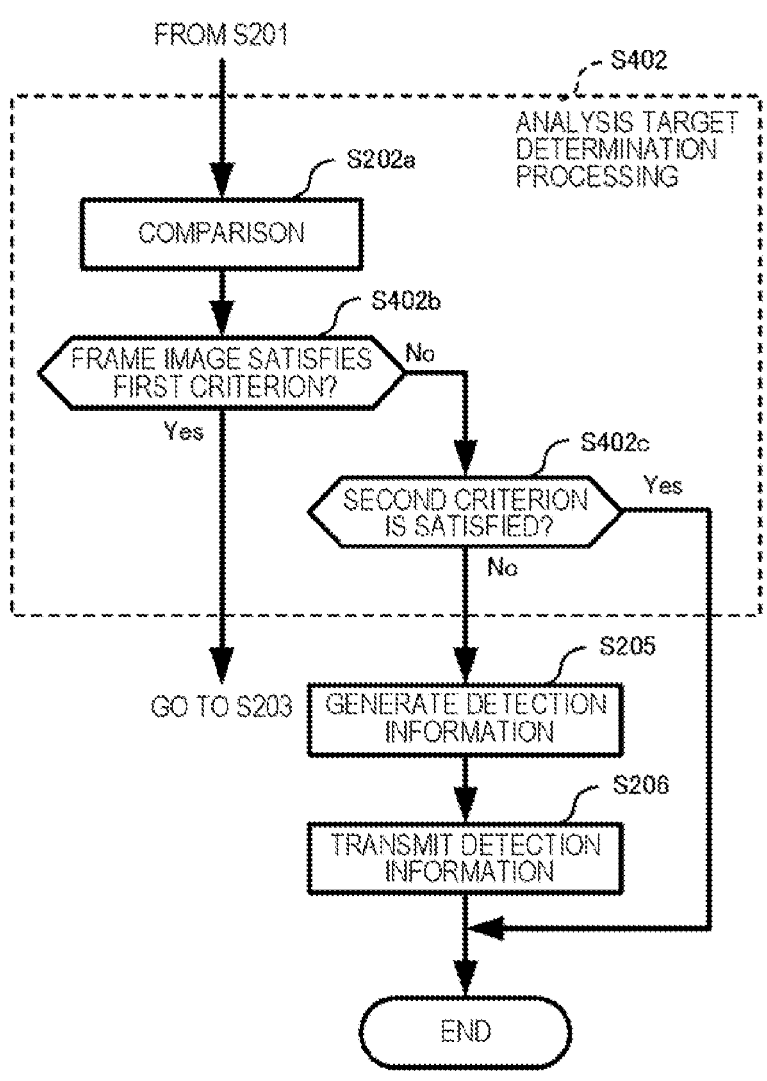
FIG. 24 is a flowchart illustrating one example of first information processing according to the third example embodiment.

FIG. 24 is a flowchart illustrating one example of the first information processing according to the third example embodiment. The first information processing according to the present example embodiment includes analysis target determination processing (step S402) that replaces the analysis target determination processing (step S202) according to the first example embodiment. With the exception of the processing described above, the road surveillance processing according to the present example embodiment may be similar to the first example embodiment. Note that, FIG. 24 is a diagram acquired by extracting a portion of a flowchart of the analysis target determination processing (step S402) according to the present example embodiment that is different from the analysis target determination processing (step S202) according to the first example embodiment.

The analysis target determination processing (step S402) includes step S202*a* being similar to the first example embodiment. Subsequently, the first determination unit 322*c* determines whether a degree of similarity being a result of comparison in step S202*a* satisfies the first criterion (step S402*b*).

When the degree of similarity is determined to satisfy the first criterion (step S402*b*; Yes), processing from step S203 onward being similar to the first example embodiment is executed.

When the degree of similarity is determined not to satisfy the first criterion (step S402*b*; No), the second determination unit 322*d* determines whether the determination result in step S402*b* satisfies the second criterion (step S402*c*).

For example, the second criterion is one of the number of times that degrees of similarity are determined not to satisfy the first criterion within a predetermined period being equal to or less than a threshold value, the frequency thereof being equal to or less than a threshold value, and the ratio thereof being equal to or less than a threshold value.

When the determination result in step S402*b* does not satisfy the second criterion, the second determination unit 322*d* determines that the frame image is not an analysis target. When the determination result in step S402*b* satisfies the second criterion, the second determination unit 322*d* determines that the frame image is an analysis target.

When the determination result in step S402*b* is determined not to satisfy the second criterion (step S402*c*; No), steps S205 and S206 that are similar to the first example embodiment are executed. When the determination result in step S402*b* is determined to satisfy the second criterion (step S402*c*; Yes), the second determination unit 322*d* ends the first information processing.

As described above, the first information processing according to the present example embodiment can, in a case where one of the number of times, a frequency, and a ratio at which frame images are determined not to satisfy the first criterion within a predetermined period is equal to or less than a predetermined threshold value, prevent detection information from being generated and transmitted.

Advantageous Effects

According to the present example embodiment, a video is constituted of a time series of frame images including at least one frame image. The target determination unit 322 includes the first determination unit 322*c* and the second determination unit 322*d*.

The first determination unit 322*c* determines whether a result of comparison between each of a time series of frame images and a reference image satisfies the first criterion. The second determination unit 322*d* determines, based on a determination result of whether each of the time series of frame images satisfies the first criterion and the second criterion, whether each of the frame images is an analysis target.

Because of this configuration, it is possible to determine, based on whether a determination result of whether each of the time series of frame images satisfies the first criterion satisfies the second criterion, whether each of the frame images is an analysis target. Then, when each of the frame images is not an analysis target, it is possible to prevent detection information from being displayed on a display unit 132.

In general, when communication failure occurs or when an insect or a bird is largely captured in a frame image, a frame image that does not satisfy the first criterion is sometimes temporarily generated. Even in such a case, the capturing area of the capturing apparatus 101 sometimes has not actually changed to an extent that prevents the first criterion from being satisfied, and informing a user of detection information leads to causing the user to put extra effort to confirm the detection information.

Since, in the present example embodiment, it is possible to prevent detection information from being displayed on the display unit 132 as described above, it is possible to reduce extra effort by a user. Therefore, it becomes possible to further support efficient road surveillance.

According to the present example embodiment, the second criterion is defined by using at least one of the number of times, a frequency, and a ratio at which a time series of frame images are determined not to satisfy the first criterion.

When the number of times, a frequency, or a ratio at which the frame images are determined not to satisfy the first criterion is small, there is a high possibility that a frame image that does not satisfy the first criterion is temporarily generated as described above. Thus, it is possible to, while preventing detection precision of a frame image that does not satisfy the first criterion from deteriorating, reduce extra effort by a user as described above. Therefore, it becomes possible to further support efficient road surveillance.

Fourth Example Embodiment

In the first example embodiment, an example in which the road surveillance system includes one capturing apparatus 101, one first information processing apparatus 102, and one second information processing apparatus 103 has been described. However, a road surveillance system may include a plurality of capturing apparatuses 101 that are installed in such a way as to capture different places on a road. The road in this case may be a specific road such as an X expressway, or may include a plurality of specific roads such as the X expressway, a Y expressway, and the like. Note that, the road may include a passage for pedestrians.

In addition, the road surveillance system may include a plurality of first information processing apparatuses 102. In this case, each of the first information processing apparatuses 102 is preferably connected, via a network N, to one or a plurality of capturing apparatuses 101 in such a way as to be able to mutually transmit and receive information to and from the capturing apparatuses 101. Because of this configuration, each of the first information processing apparatuses 102 is capable of detecting a road state being a state of an object on a road by processing an image in which one or a plurality of capturing apparatuses 101 capture the road.

Note that, such a change can be applied to not only the first example embodiment but also the second and third example embodiments.

Figure 25:
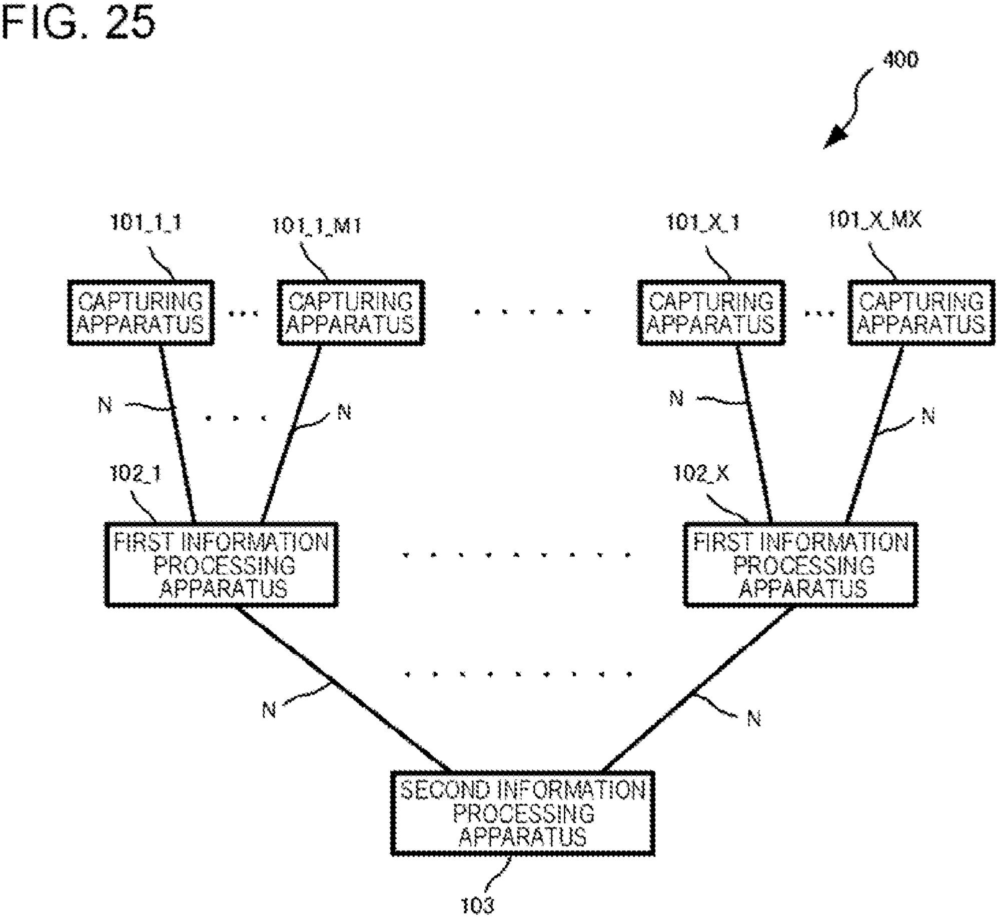
FIG. 25 is a diagram illustrating a configuration example of a road surveillance system according to a fourth example embodiment.

FIG. 25 is a diagram illustrating a configuration example of a road surveillance system 400 according to a fourth example embodiment. The road surveillance system 400 includes a plurality of capturing apparatuses 101_1_1 to 101_1_M1 and 101_X_1 to 101_X_MX, one or a plurality of first information processing apparatuses 102_1 to 10_ X, and a second information processing apparatus 103. Each of M1, MX, and X is an integer of 1 or more.

Each of the plurality of capturing apparatuses 101_1_1 to 101_1_M1 and 101_X_1 to 101_X_MX is installed in such a way as to capture different places on a road. Each of the plurality of capturing apparatuses 101_1_1 to 101_1_M1 and 101_X_1 to 101_X_MX is equivalent to, for example, the capturing apparatus 101 according to the first example embodiment. Thus, each of the plurality of capturing apparatuses 101_1_1 to 101_1_M1 and 101_X_1 to 101_X_MX captures the road and generates a video. Note that, the video is constituted of a time series of frame images, that is, a plurality of frame images, as described above.

When X is equal to or greater than 2, each of the first information processing apparatuses 102_1 to 102_X is equivalent to the first information processing apparatus 102 according to the first example embodiment. For example, in each of the first information processing apparatuses 102_1 to 102_X according to the present example embodiment, a video acquisition unit 121 acquires a plurality of videos in each of which one of the plurality of capturing apparatuses 101_1_1 to 101_1_M1 and 101_X_1 to 101_X_MX captures the road.

A target determination unit 122, for example, determines, based on a result of comparison between each of a plurality of frame images that are constituted of each of the plurality of videos that the video acquisition unit 121 acquires and a reference image and a first criterion, whether each of the plurality of frame images is an analysis target.

Advantageous Effects

According to the fourth example embodiment described above, the road surveillance system 400 further includes the plurality of capturing apparatuses 101_1_1 to 101_1_M1 and 101_X_1 to 101_X_MX that capture a road and generate a video.

The video acquisition unit 121 acquires a plurality of videos in each of which one of the plurality of capturing apparatuses 101_1_1 to 101_1_M1 and 101_X_1 to 101_X_MX captures the road. The target determination unit 122 determines, based on a result of comparison between each of a plurality of frame images that are constituted of each of the plurality of videos and the reference image and the first criterion, whether each of the plurality of frame images is an analysis target.

Because of this configuration, it is possible to determine whether videos that the plurality of capturing apparatuses 101_1_1 to 101_1_M1 and 101_X_1 to 101_X_MX generate are analysis targets, by using the first criterion. Then, it is possible to, with respect to a frame image being an analysis target, display an analysis result by using the frame image on a display unit 132 and inform a user of the analysis result. Thus, a user can refer to appropriate an analysis result based on a frame image serving as an analysis target and perform surveillance of a wide area of the road. Therefore, it becomes possible to support efficient road surveillance.

In addition, with respect to a frame image not being an analysis target, it is possible to display detection information on the display unit 132 and thereby inform a user that a frame image not being an analysis target is detected. A user who is made aware of the detection of a frame image not being an analysis target can take an action, such as correcting a direction of a capturing apparatus 101 based on the detection information, in such a way that a wide range of frame image is appropriately captured. After the action, surveillance of a wide area of the road can be performed, based on an appropriate analysis result. Therefore, it becomes possible to support efficient road surveillance.

While the example embodiments of the present invention have been described with reference to the drawings, the example embodiments are only exemplification of the present invention, and various configurations other than the above-described example embodiments can also be employed.

Further, the plurality of steps (pieces of processing) are described in order in the plurality of flowcharts used in the above-described description, but an execution order of steps executed in each of the example embodiments is not limited to the described order. In each of the example embodiments, an order of illustrated steps may be changed within an extent that there is no harm in context. Further, each of the example embodiments and modified examples described above can be combined within an extent that a content is not inconsistent.

A part or the whole of the above-described example embodiments may also be described in supplementary notes below, which is not limited thereto.

1. A road surveillance system including:
   a video acquisition means for acquiring a video that captures a road;
   a target determination means for determining, based on a result of comparison between at least one frame image constituting the video and a reference image, and a first criterion, whether the at least one frame image is an analysis target; and
   a display control means for causing a display means to display information based on a result of the determination, wherein
   the display control means includes
   a first control means for causing the display means to display an analysis result of the at least one frame image being determined to be the analysis target, and
   a second control means for causing the display means to display detection information indicating that a frame image not being an analysis target is detected.
2. The road surveillance system according to supplementary note 1, wherein
   the target determination means determines, based on a result of comparison between an image feature value of the at least one frame image and an image feature value of the reference image, and the first criterion, whether the at least one frame image is the analysis target.
3. The road surveillance system according to supplementary note 2, wherein
   the image feature value is a feature value that indicates an area captured in the at least one frame image.
4. The road surveillance system according to any one of supplementary notes 1 to 3, further including
   a selection means for selecting the reference image from among a plurality of candidate images according to a selection condition defining a condition for selecting the reference image.
5. The road surveillance system according to supplementary note 4, wherein
   the selection condition includes at least one of (1) a condition relating to a capturing environment, and (2) a condition relating to timing at which the reference image is switched.
6. The road surveillance system according to supplementary note 5, wherein
   the selection condition includes a condition relating to the capturing environment,
   the plurality of candidate images include an image being associated with a different capturing environment, and
   the selection means selects the reference image from among one or a plurality of candidate images that are associated with a capturing environment common to the at least one frame image.
7. The road surveillance system according to supplementary note 6, wherein
   the capturing environment includes at least one of an attribute of capturing timing and a weather condition.
8. The road surveillance system according to any one of supplementary notes 5 to 7, wherein
   the selection condition includes a condition relating to timing at which the reference image is switched, and
   the selection means selects the reference image from among the plurality of candidate images at timing at which the reference image is switched.
9. The road surveillance system according to supplementary note 8, wherein
   a condition relating to timing at which the reference image is switched is defined by using at least one of a time interval and an operation schedule.
10. The road surveillance system according to any one of supplementary notes 1 to 9, wherein
   the video is constituted of a time series of frame images including the at least one frame image, and
   the target determination means includes
   a first determination means for determining whether a result of comparison between each of the time series of frame images and the reference image satisfies the first criterion, and
   a second determination means for determining, based on a determination result of whether each of the time series of frame images satisfies the first criterion, and a second criterion, whether each of the frame images is the analysis target.

11. The road surveillance system according to supplementary note 10, wherein the second criterion is defined by using at least one of a number of times, a frequency, and a ratio at which the time series of frame images are determined not to satisfy the first criterion.

12. The road surveillance system according to any one of supplementary notes 1 to 11, further including a plurality of capturing means for capturing the road and generating a video, wherein the video acquisition means acquires a plurality of the videos in each of which one of the plurality of capturing means captures the road, and the target determination means determines, based on a result of comparison between each of a plurality of frame images constituting each of the plurality of videos and a reference image, and the first criterion, whether each of the plurality of frame images is the analysis target.

13. The road surveillance system according to any one of supplementary notes 1 to 12, wherein the detection information includes information relating to the frame image being used to determine that the frame image is not an analysis target.

14. The road surveillance system according to supplementary note 13, wherein information relating to the frame image includes at least one of (1) capturing apparatus identification information for identifying a capturing apparatus that captures the frame image, (2) at least one of a frame image being used for the determination and the reference image, and (3) deviation information relating to a deviation of an area captured in the frame image.

15. The road surveillance system according to supplementary note 14, wherein the second control means, in a case where the detection information includes the frame image and the reference image, causes the display means to display the frame image and the reference image side by side.

16. An information processing apparatus including:

a video acquisition means for acquiring a video that captures a road;

a target determination means for determining, based on a result of comparison between at least one frame image constituting the video and a reference image, and a first criterion, whether the at least one frame image is an analysis target; and a transmission means for transmitting information based on a result of the determination, wherein the transmission means includes a first transmission means for transmitting an analysis result of the at least one frame image being determined to be the analysis target, and a second transmission means for transmitting detection information indicating that a frame image not being an analysis target is detected.

17. A road surveillance method including, by one or more computers:

acquiring a video that captures a road;

determining, based on a result of comparison between at least one frame image constituting the video and a reference image, and a first criterion, whether the at least one frame image is an analysis target; and causing a display means to display information based on a result of the determination, wherein the causing the display means to display information includes causing the display means to display an analysis result of the at least one frame image being determined to be the analysis target, and causing the display means to display detection information indicating that a frame image not being an analysis target is detected.

18. A program causing one or more computers to execute:

acquiring a video that captures a road;

determining, based on a result of comparison between at least one frame image constituting the video and a reference image, and a first criterion, whether the at least one frame image is an analysis target; and causing a display means to display information based on a result of the determination, wherein the causing the display means to display information includes causing the display means to display an analysis result of the at least one frame image being determined to be the analysis target, and causing the display means to display detection information indicating that a frame image not being an analysis target is detected.

19. A storage medium storing a program causing one or more computers to execute:

acquiring a video that captures a road;

determining, based on a result of comparison between at least one frame image constituting the video and a reference image, and a first criterion, whether the at least one frame image is an analysis target; and causing a display means to display information based on a result of the determination, wherein the causing the display means to display information includes causing the display means to display an analysis result of the at least one frame image being determined to be the analysis target, and causing the display means to display detection information indicating that a frame image not being an analysis target is detected.

What is claimed is:

1. A road surveillance system comprising:

at least one memory configured to store instructions; and at least one processor configured to execute the instructions to execute:

acquiring a video that captures a road;

selecting a reference image from among a plurality of candidate images according to a selection condition defining a condition for selecting the reference image, determining, based on a result of comparison between at least one frame image constituting the video and the reference image, and a first criterion, whether the at least one frame image is an analysis target; and causing a display to display information based on a result of the determination, wherein causing the display to display the information includes causing the display to display an analysis result of the at least one frame image being determined to be the analysis target, and causing the display to display detection information indicating that a frame image not being an analysis target is detected, the selection condition includes a condition relating to a capturing environment including an attribute of capturing time and a weather condition, the plurality of candidate images include an image being associated with a different capturing environment, and selecting the reference image includes selecting the reference image from among one or a plurality of candidate images that are associated with the capturing environment common to the at least one frame image.

2. The road surveillance system according to claim 1, wherein determining whether the at least one frame image is the analysis target includes determining, based on a result of comparison between an image feature value of the at least one frame image and an image feature value of the reference image, and the first criterion, whether the at least one frame image is the analysis target.

3. The road surveillance system according to claim 1, wherein the selection condition further includes a condition relating to time at which the reference image is switched.

4. The road surveillance system according to claim 3, wherein selecting the reference image includes selecting the reference image from among the plurality of candidate images at time at which the reference image is switched.

5. The road surveillance system according to claim 1, wherein the video is constituted of a time series of frame images including the at least one frame image, and determining whether the at least one frame image is the analysis target includes determining whether a result of comparison between each of the time series of frame images and the reference image satisfies the first criterion, and determining, based on a determination result of whether each of the time series of frame images satisfies the first criterion, and a second criterion, whether each of the frame images is the analysis target.

6. The road surveillance system according to claim 1, further comprising generating a plurality of videos in each of which the road is captured, wherein acquiring the video that captures the road includes acquiring the plurality of the videos in each of which the road is captured, and determining, based on a result of comparison between each of a plurality of frame images constituting each of the plurality of videos and a reference image, and the first criterion, whether each of the plurality of frame images is the analysis target.

7. A road surveillance method comprising, by one or more computers:

acquiring a video that captures a road;

selecting a reference image from among a plurality of candidate images according to a selection condition defining a condition for selecting the reference image, determining, based on a result of comparison between at least one frame image constituting the video and the reference image, and a first criterion, whether the at least one frame image is an analysis target; and causing a display to display information based on a result of the determination, wherein the causing the display to display information includes causing the display to display an analysis result of the at least one frame image being determined to be the analysis target, and causing the display to display detection information indicating that a frame image not being an analysis target is detected, the selection condition includes a condition relating to a capturing environment including an attribute of capturing time and a weather condition, the plurality of candidate images include an image being associated with a different capturing environment, and selecting the reference image includes selecting the reference image from among one or a plurality of candidate images that are associated with the capturing environment common to the at least one frame image.

8. The road surveillance method according to claim 7, wherein determining whether the at least one frame image is the analysis target includes determining, based on a result of comparison between an image feature value of the at least one frame image and an image feature value of the reference image, and the first criterion, whether the at least one frame image is the analysis target.

9. The road surveillance method according to claim 7, wherein the selection condition further includes a condition relating to time at which the reference image is switched.

10. The road surveillance method according to claim 9, wherein selecting the reference image includes selecting the reference image from among the plurality of candidate images at time at which the reference image is switched.

11. The road surveillance method according to claim 7, wherein the video is constituted of a time series of frame images including the at least one frame image, and determining whether the at least one frame image is the analysis target includes determining whether a result of comparison between each of the time series of frame images and the reference image satisfies the first criterion, and determining, based on a determination result of whether each of the time series of frame images satisfies the first criterion, and a second criterion, whether each of the frame images is the analysis target.

12. The road surveillance method according to claim 7, further comprising generating a plurality of videos in each of which the road is captured, wherein acquiring the video that captures the road includes acquiring the plurality of the videos in each of which the road is captured, and determining, based on a result of comparison between each of a plurality of frame images constituting each of the plurality of videos and a reference image, and the first criterion, whether each of the plurality of frame images is the analysis target.

13. A non-transitory storage medium storing program causing one or more computers to execute:

acquiring a video that captures a road;

selecting a reference image from among a plurality of candidate images according to a selection condition defining a condition for selecting the reference image, determining, based on a result of comparison between at least one frame image constituting the video and the reference image, and a first criterion, whether the at least one frame image is an analysis target; and causing a display to display information based on a result of the determination, wherein the causing the display to display information includes causing the display to display an analysis result of the at least one frame image being determined to be the analysis target, and causing the display to display detection information indicating that a frame image not being an analysis target is detected, the selection condition includes a condition relating to a capturing environment including an attribute of capturing time and a weather condition, the plurality of candidate images include an image being associated with a different capturing environment, and selecting the reference image includes selecting the reference image from among one or a plurality of candidate images that are associated with the capturing environment common to the at least one frame image.

14. The non-transitory storage medium storing the program according to claim 13, wherein determining whether the at least one frame image is the analysis target includes determining, based on a result of comparison between an image feature value of the at least one frame image and an image feature value of the reference image, and the first criterion, whether the at least one frame image is the analysis target.

15. The non-transitory storage medium storing the program according to claim 13, wherein the selection condition further includes a condition relating to time at which the reference image is switched.

16. The non-transitory storage medium storing the program according to claim 15, wherein selecting the reference image includes selecting the reference image from among the plurality of candidate images at time at which the reference image is switched.

17. The non-transitory storage medium storing the program according to claim 13, wherein the video is constituted of a time series of frame images including the at least one frame image, and determining whether the at least one frame image is the analysis target includes determining whether a result of comparison between each of the time series of frame images and the reference image satisfies the first criterion, and determining, based on a determination result of whether each of the time series of frame images satisfies the first criterion, and a second criterion, whether each of the frame images is the analysis target.

18. The road surveillance system according to claim 4, wherein the condition relating to timing at which the reference image is switched is defined by using at least one of a time interval and an operation schedule.

19. The road surveillance system according to claim 1, wherein the video is constituted of a time series of frame images including the at least one frame image, determining whether the at least one frame image is the analysis target includes determining whether a result of comparison between each of the time series of frame images and the reference image satisfies the first criterion, and determining, based on a determination result of whether each of the time series of frame images satisfies the first criterion, and a second criterion, whether each of the frame images is the analysis target, and the second criterion is defined by using at least one of a number of times, a frequency, and a ratio at which the time series of frame images are determined not to satisfy the first criterion.

* * * * *